United States Patent
Lee et al.

(10) Patent No.: US 9,288,704 B2
(45) Date of Patent: Mar. 15, 2016

(54) METHOD FOR A TERMINAL TO TRANSMIT CHANNEL STATE INFORMATION TO A BASE STATION IN A RADIO COMMUNICATION SYSTEM, AND DEVICE FOR SAME

(75) Inventors: Seungmin Lee, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 13/978,637

(22) PCT Filed: Jan. 3, 2012

(86) PCT No.: PCT/KR2012/000038
§ 371 (c)(1),
(2), (4) Date: Jul. 8, 2013

(87) PCT Pub. No.: WO2012/096465
PCT Pub. Date: Jul. 19, 2012

(65) Prior Publication Data
US 2013/0279424 A1  Oct. 24, 2013

Related U.S. Application Data

(60) Provisional application No. 61/432,582, filed on Jan. 13, 2011.

(51) Int. Cl.
*H04W 24/10* (2009.01)
*H04L 27/26* (2006.01)
*H04L 5/00* (2006.01)

(52) U.S. Cl.
CPC ............ *H04W 24/10* (2013.01); *H04L 5/0057* (2013.01); *H04L 27/2602* (2013.01); *H04L 5/001* (2013.01); *H04L 5/0023* (2013.01); *H04L 5/0035* (2013.01)

(58) Field of Classification Search
CPC ... H04L 5/001; H04L 27/2602; H04L 5/0035; H04L 5/0023; H04L 5/0057; H04L 1/1867; H04L 5/0053; H04L 1/0027; H04L 5/0016; H04L 1/0028; H04L 1/1861; H04L 25/033434; H04L 2025/03426; H04L 1/06; H04L 27/2601; H04L 1/1893; H04L 1/00; H04L 5/00; H04W 24/10; H04W 72/10; H04W 72/0413; H04W 72/0406; H04W 72/04; H04W 72/02; H04B 7/0626

See application file for complete search history.

(56) References Cited

U.S. PATENT DOCUMENTS 8,526,519 B2 * 9/2013 Chen ................. H04L 25/03343
375/260
9,049,618 B2 * 6/2015 Guo ....................... H04L 5/0096
(Continued)

FOREIGN PATENT DOCUMENTS

| CN | 101699781 | 4/2010 |
|---|---|---|
| CN | 101883391 | 11/2010 |
| EP | 2037616 | 3/2009 |

OTHER PUBLICATIONS

3rd Generation Partnership Project (3GPP), Technical Specification Group Radio Access Network; Evolved Universal Terrestrial Radio Access (E-UTRA); Physical layer procedures (Release 10); 3GPP TS 36.213 V10.0.1, Dec. 2010, 98 pages (relevant sections: section 7.2).

(Continued)

*Primary Examiner* — Gary Mui
*Assistant Examiner* — Michael Phillips
(74) *Attorney, Agent, or Firm* — Lee, Hong, Degerman, Kang & Waimey

(57) ABSTRACT

A method for a terminal to allocate a resource for transmitting uplink control information to a serving base station (BS) in a radio communication system includes when a report of at least one periodic RI and a report of at least one aperiodic RI occur in the same subframe, mapping the at least one periodic RI and the at least one aperiodic RI into a physical uplink shared channel of the subframe and transmitting the mapped at least one periodic RI and at least one aperiodic RI to the serving BS. The at least one aperiodic RI may correspond to at least one component carrier wave in each of the serving BS and an adjacent BS for CoMP transmission of the serving BS and the adjacent BS, and the at least one periodic RI may correspond to at least one component carrier wave for non-CoMP transmission in the serving BS.

8 Claims, 27 Drawing Sheets

(56) References Cited

U.S. PATENT DOCUMENTS

| | | | |
|---|---|---|---|
| 2009/0175159 A1 | 7/2009 | Bertrand et al. | |
| 2009/0207784 A1* | 8/2009 | Lee | H04B 7/063 370/328 |
| 2010/0039953 A1 | 2/2010 | Zhang | |
| 2010/0098012 A1* | 4/2010 | Bala et al. | 370/329 |
| 2010/0165931 A1* | 7/2010 | Nimbalker | H04L 1/0028 370/329 |
| 2010/0214972 A1 | 8/2010 | Che et al. | |
| 2011/0141928 A1* | 6/2011 | Shin et al. | 370/252 |
| 2011/0249578 A1* | 10/2011 | Nayeb Nazar et al. | 370/252 |
| 2011/0305161 A1* | 12/2011 | Ekpenyong | H04L 1/0031 370/252 |
| 2012/0039256 A1* | 2/2012 | Kwon | H04W 48/12 370/328 |
| 2012/0052895 A1* | 3/2012 | Clerckx et al. | 455/509 |
| 2012/0087299 A1* | 4/2012 | Bhattad | H04L 5/0053 370/315 |
| 2012/0127869 A1* | 5/2012 | Yin et al. | 370/252 |
| 2012/0140708 A1* | 6/2012 | Choudhury | H04W 72/082 370/328 |
| 2012/0320852 A1* | 12/2012 | Seo et al. | 370/329 |
| 2013/0022007 A1* | 1/2013 | Berggren et al. | 370/329 |
| 2013/0077595 A1* | 3/2013 | Aiba et al. | 370/329 |
| 2013/0114554 A1* | 5/2013 | Yang et al. | 370/329 |

OTHER PUBLICATIONS

Samsung, "HARQ-ACK Resource Indication in PUCCH for DL CA," 3GPP TSG RAN WG1 #63, R1-106013, Nov. 2010, 2 pages.
PCT International Application No. PCT/KR2012/000038, Written Opinion of the International Searching Authority dated Sep. 27, 2012, 14 pages.

* cited by examiner

FIG. 2
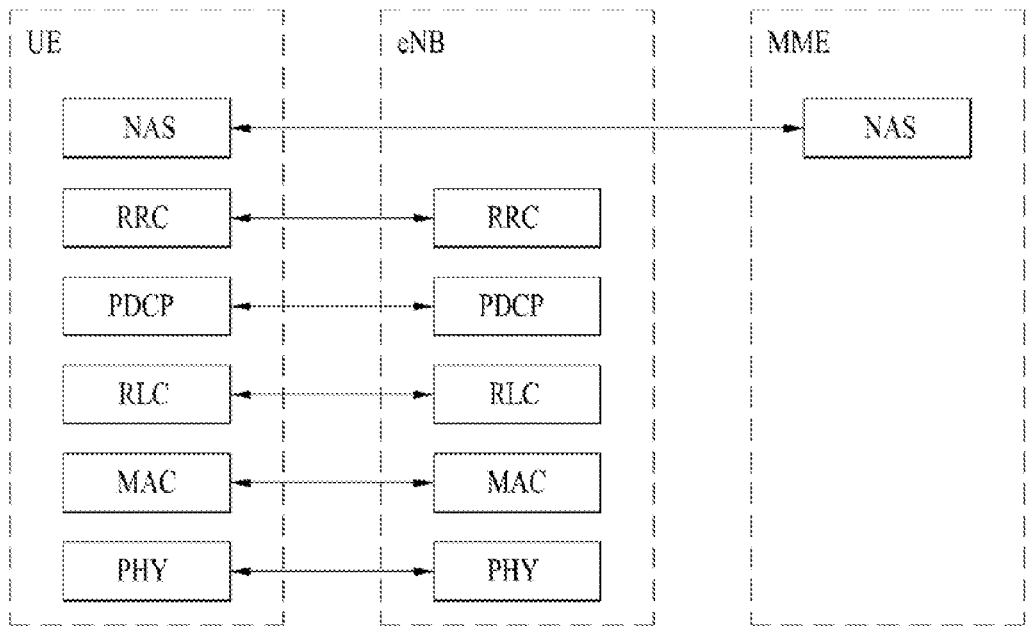
(a) CONTROL PLANE PROTOCOL STACK
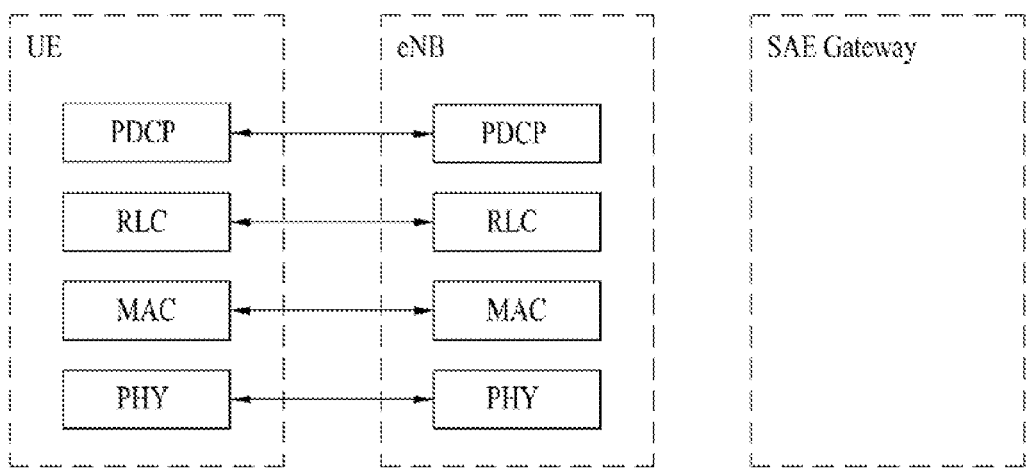
(b) USER PLANE PROTOCOL STACK

US 9,288,704 B2

METHOD FOR A TERMINAL TO TRANSMIT CHANNEL STATE INFORMATION TO A BASE STATION IN A RADIO COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2012/000038, filed on Jan. 3, 2012, which claims the benefit of U.S. Provisional Application Ser. No. 61/432,582, filed on Jan. 13, 2011, the contents of which are all hereby incorporated by reference herein in their entirety.

TECHNICAL FIELD

The present invention relates to a wireless communication system, and more particularly, to a method of transmitting a channel state information, which is transmitted by a user equipment in a wireless communication system, to an eNode B and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE (long term evolution) system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting channel state information, which is transmitted by a user equipment in a wireless communication system, to an eNode B and an apparatus therefor in the following description based on the discussion mentioned in the foregoing description.

Technical Solution

To achieve these and other advantages and in accordance with the purpose of the present invention, as embodied and broadly described, according to one embodiment of the present invention a method of transmitting a rank indicator, which is transmitted by a user equipment to a serving base station in a wireless communication system includes the steps of if a report on at least one periodic RI and a report on at least one aperiodic RI occur in an identical subframe, mapping the at least one periodic RI and the at least one aperiodic RI to a physical uplink shared channel (PUSCH) of the subframe and transmitting the at least one periodic RI and the at least one aperiodic RI to the serving base station.

Meanwhile, to further achieve these and other advantages and in accordance with the purpose of the present invention, according to a different embodiment a user equipment device in a wireless communication system includes if a report on at least one periodic RI and a report on at least one aperiodic RI occur in an identical subframe, a processor configured to map the at least one periodic RI and the at least one aperiodic RI to a physical uplink shared channel (PUSCH) of the subframe and a transmission module configured to transmit the at least one periodic RI and the at least one aperiodic RI to the serving base station.

Preferably, the at least one aperiodic RI corresponds to at least one component carrier configured in each of the serving base station and a neighboring base station in order for the serving base station and the neighboring base station to transmit a coordinated multi point and the at least one periodic RI corresponds to at least one component carrier configured in the serving base station for a non-CoMP transmission.

Meanwhile, after performing a time first mapping of the at least one aperiodic RI to resource elements corresponding to a pre-defined symbol of the subframe in a descending order of a subcarrier index, it is able to perform the time first mapping of the at least one periodic RI to resource elements corresponding to the pre-defined symbol in the descending order of the subcarrier index. In this case, each of the at least one aperiodic RI and the at least one periodic RI are mapped in an eNode B index order or a component carrier index order. Or, a pre-determined priority, e.g., the RI for a component carrier used for a non-CoMP transmission can be mapped preferentially or at the end.

Or, the mapping step includes the steps of performing a time first mapping of the at least one aperiodic RI to resource elements corresponding to a pre-defined symbol of the subframe in a descending order of a subcarrier index, performing the time first mapping of CQI (channel quality indicator)/PMI (precoding matrix index) information in an ascending order of the subcarrier index, and performing the time first mapping of the at least one periodic RI followed by the CQI/PMI information in the ascending order of the subcarrier index.

Moreover, the mapping step includes the steps of jointly encoding the at least one periodic RI and the at least of aperiodic RI and performing a time first mapping of the jointly encoded RI information to resource elements corresponding to a pre-defined symbol of the subframe in a descending order of a subcarrier index.

Advantageous Effects

According to embodiments of the present invention, a user equipment may be able to effectively transmit a channel state information to an eNode B in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a diagram for structures of control and user planes of radio interface protocol between a 3GPP radio access network standard-based user equipment and E-UTRAN;

BEST MODE

Mode for Invention

Figure 1:
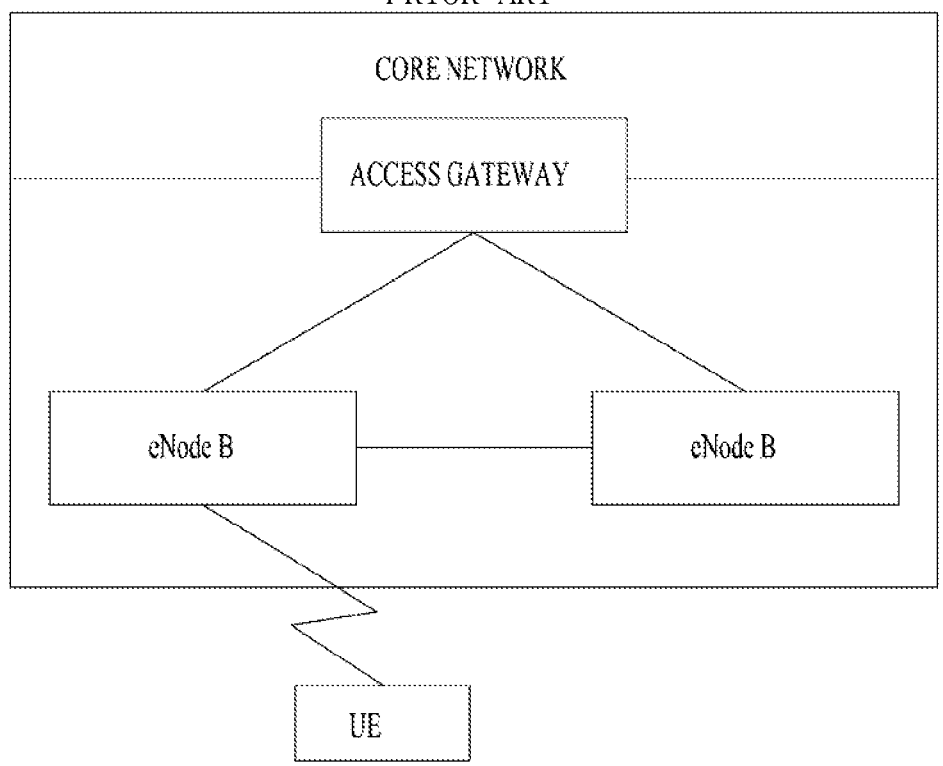
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
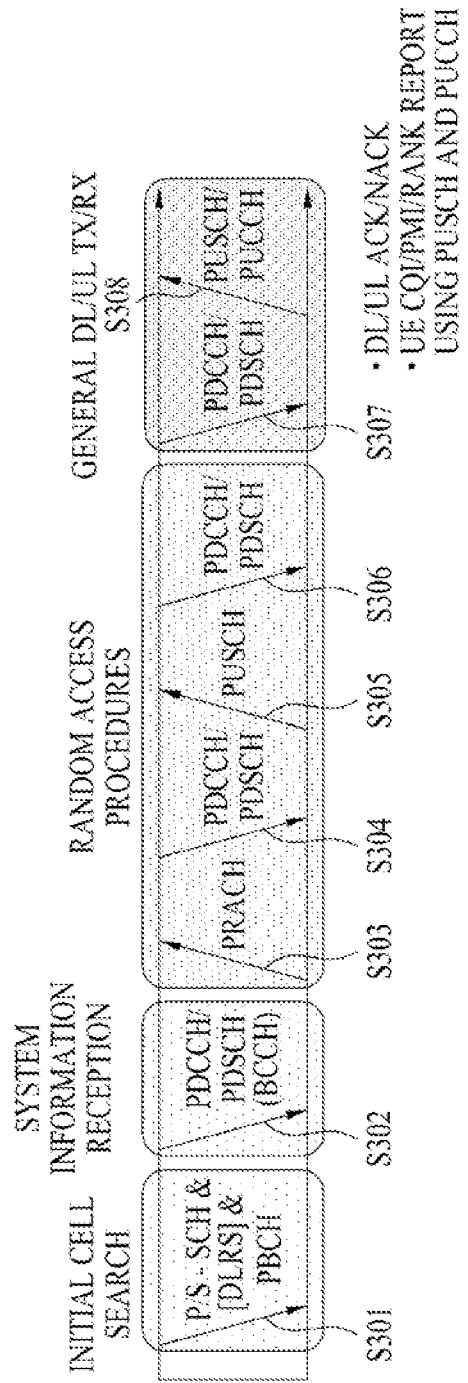
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
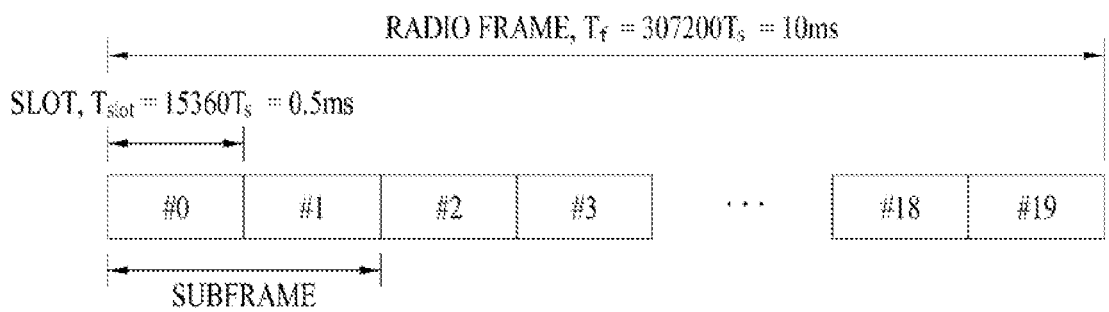
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
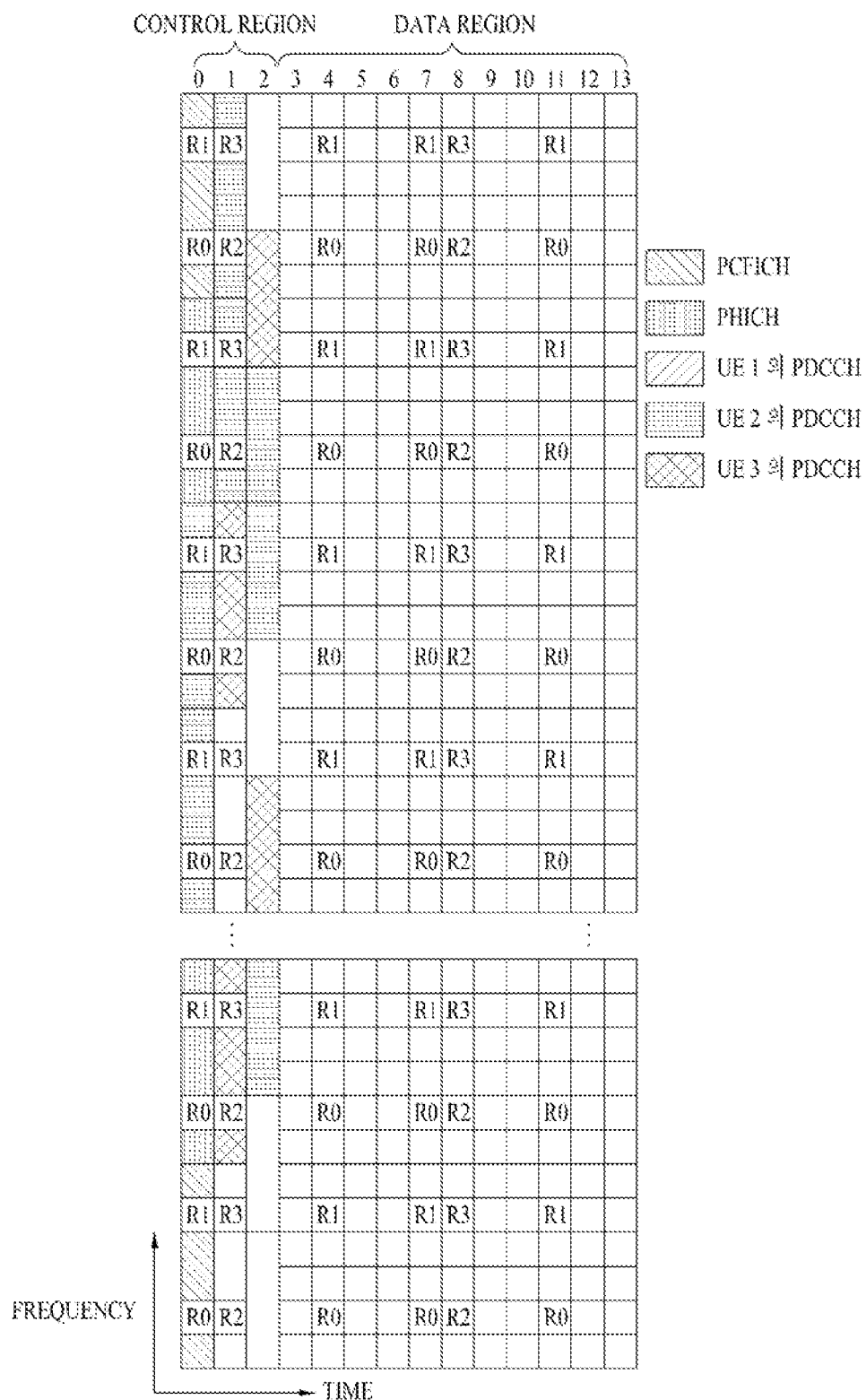
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
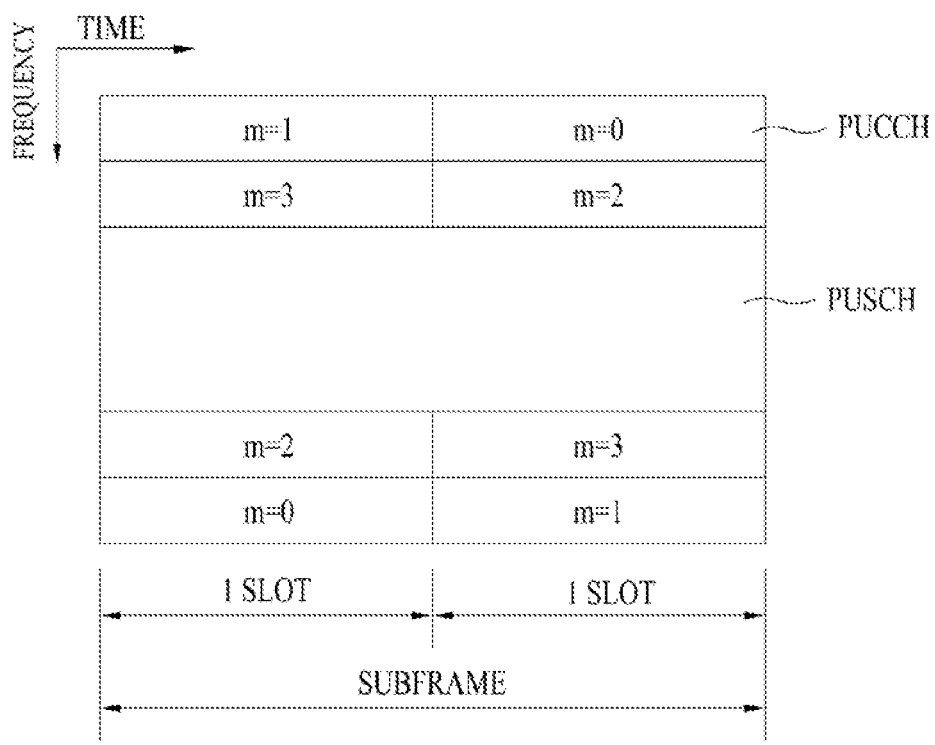
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

Figure 7:
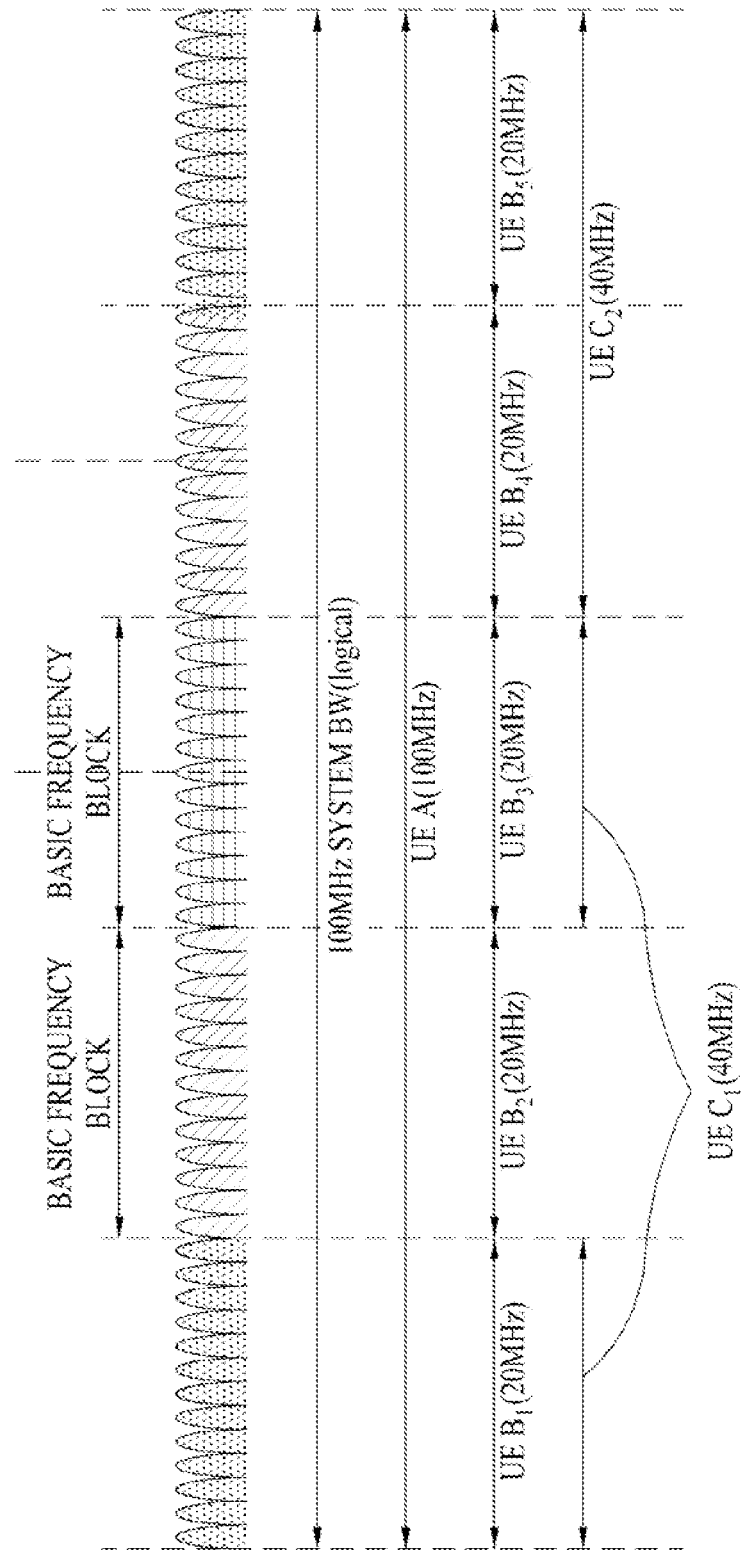
FIG. 7 is a conceptual diagram for explaining a carrier aggregation scheme.

FIG. 7 is a conceptual diagram for explaining a carrier aggregation scheme. A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Referring to FIG. 7, a total system bandwidth (system BW) may have a system bandwidth up to maximum 100 MHz as a logical bandwidth. The total system bandwidth includes five component carriers and each of the component carriers may have up to maximum 20 MHz. A component carrier includes at least one physically contiguous subcarrier. Although each of the component carriers in FIG. 7 depicted as they have an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 7, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

According to the present specification, a component carrier may correspond to a system bandwidth of a legacy system. By defining a component carrier on the basis of a legacy system, it may become easy to provide backward compatibility and to design a system in a radio communication environment in which evolved UE and a legacy UE coexist. As an example, in case that LTE-A system supports a carrier aggregation, each of the component carriers may correspond to a system bandwidth of LTE system. In this case, a component carrier may be able to have a bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. UE A may use 100 MHz, which corresponds to the total system bandwidth, and may be able to perform a communication in a manner of using all of the five component carriers. UE $B_1 \sim B_5$ may be able to use a bandwidth of 20 MHz only and performs a communication by using one component carrier. UE $C_1$ and UE $C_2$ may be able to use a bandwidth of 40 MHz and performs a communication by using two component carriers, respectively. The two component carriers may or may not be logically/physically adjacent to each other. The UE $C_1$ indicates a case that two components carriers not adjacent to each other are used and the UE $C_2$ indicates a case that two component carrier adjacent to each other are used.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 8:
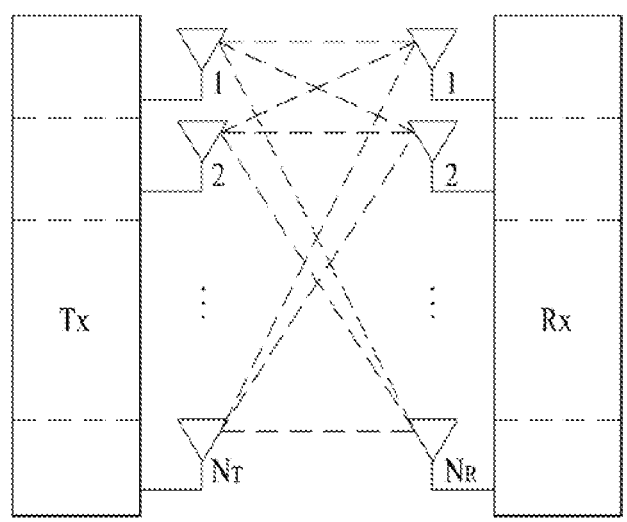
FIG. 8 is a block diagram of a general multi-antenna (MIMO) communication system.

A block diagram of a general multi-antenna communication system is depicted in FIG. 8. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 8, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector S. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_r) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in case of a DL, a user equipment may be able to instantaneously receive data simultaneously from each of the base stations performing the CoMP transmission method. And, a reception performance can be enhanced in a manner of combining the signals received from each of the base stations. On the other hand, according to the coordinated scheduling/beamforming method (CoMP-CS/CB), the user equipment may be able to instantaneously receive data from a single base station via a beamforming.

According to the joint processing (CoMP-JP) method in case of an UL, each of the base stations may be able to simultaneously receive PUSCH signal from the user equipment. On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

Figure 9:
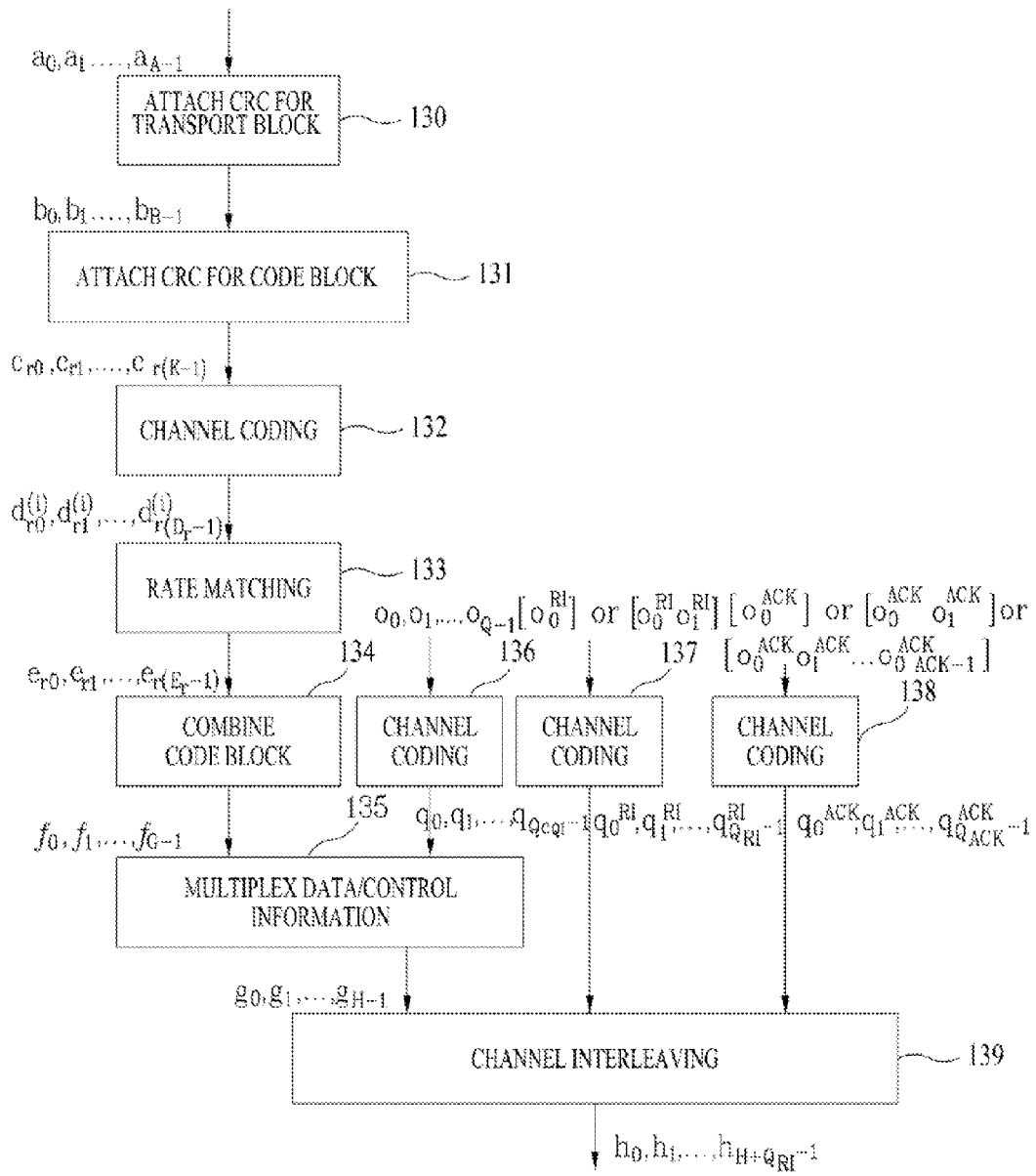
FIG. 9 is a block diagram for explaining a process of a physical uplink shared channel.

Meanwhile, explanation on a processing structure of a physical uplink shared channel (PUSCH) is as follows. FIG. 9 is a block diagram for explaining a process of a physical uplink shared channel. As shown in the FIG. 9, data information multiplexed together with control information is transmitted in a following manner. First of all, CRC (cyclic redundancy check) for TB (transport block) is attached to a transport block (hereinafter abbreviated TB), which should be transmitted in UL [S130], the information is divided into a plurality of code blocks (hereinafter abbreviated CB) according to a size of the TB, and CRC for the CB is attached to a plurality of the CBs [S131]. According to a result value of the aforementioned process, a channel coding is performed [S132]. Moreover, after a channel coded data goes through a rate matching [S133], a combination between the CBs is performed again [S134]. These combined CBs are multiplexed with CQI/PMI (channel quality information/precoding matrix index) [S135].

Meanwhile, a channel coding on the CQI/PMI is performed on the sidelines of the data [S136]. The channel coded CQI/PMI is multiplexed with the data [S135].

And, a channel coding on an RI (rank indication) is performed on the sidelines of the data as well [S137].

In case of ACK/NACK (acknowledgement/negative acknowledgement), a channel coding is performed on the sidelines of the data, CQI, PMI and RI [S138]. An output signal is generated in a manner of interleaving the multiplexed data, the CQI/PMI, the separately channel coded RI and ACK/NACK [S139].

Meanwhile, a physical resource element (hereinafter abbreviated RE) for data and control channel in an LTE UL system is explained in the following description.

Figure 10:
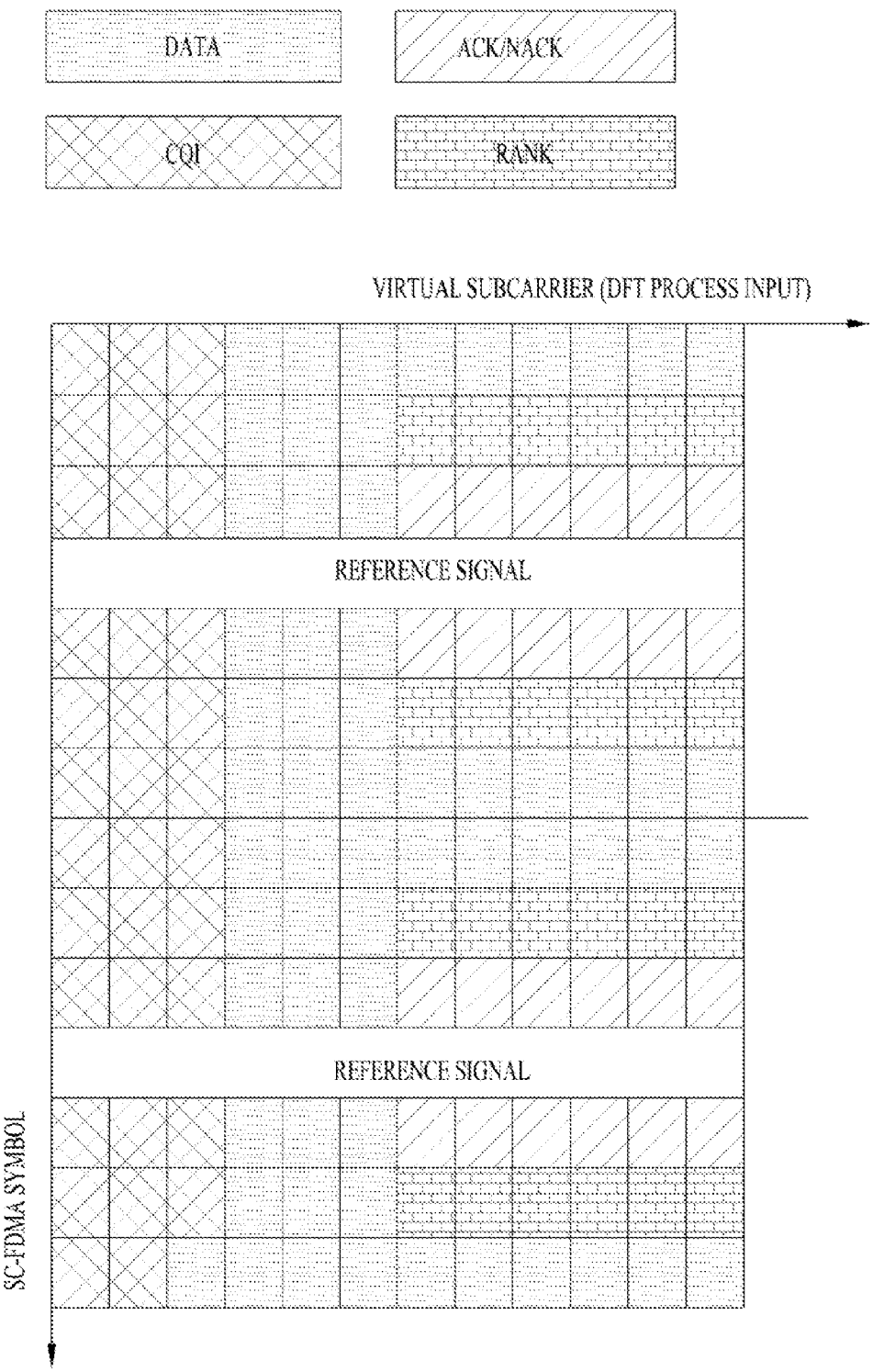
FIG. 10 is a diagram for explaining a method of mapping a physical resource to transmit an uplink data and a control channel.

FIG. 10 is a diagram for explaining a method of mapping a physical resource to transmit an uplink data and a control channel.

Referring to FIG. 10, CQI/PMI and the data are mapped to an RE by a time-first scheme. An encoded ACK/NACK is inserted in the vicinity of a demodulation reference signal (DM RS) in a manner of being punctured. And, an RI is mapped to an RE next to the RE at which the ACK/NACK is situated. The resource for the RI and the ACK/NACK may be able to occupy maximum 4 SC-FDMA symbols. In case that data and control information are transmitted to an UL shared channel at the same time, a mapping is performed in the following order; RI, concatenation of CQI/PMI and data, and ACK/NACK. In particular, the RI is mapped first and then the concatenation of CQI/PMI and data is mapped to the rest of REs except the RE to which the RI is mapped by the time-first scheme. The ACK/NACK is mapped in a manner of puncturing the concatenation of CQI/PMI and data, which is already mapped.

As mentioned in the foregoing description, by multiplexing an uplink control information (UCI) such as CQI/PMI and the like, a single carrier property can be satisfied. Hence, an uplink transmission maintaining a low CM (cubic metric) can be achieved.

In a system (e.g., LTE Rel-10) by which a legacy system is enhanced, at least one transmission scheme of a SC-FDMA and a clustered DFTs OFDMA can be applied to each user equipment on each of component carriers to perform a UL transmission and can be applied together with an UL-MIMO (uplink-MIMO).

Figure 11:
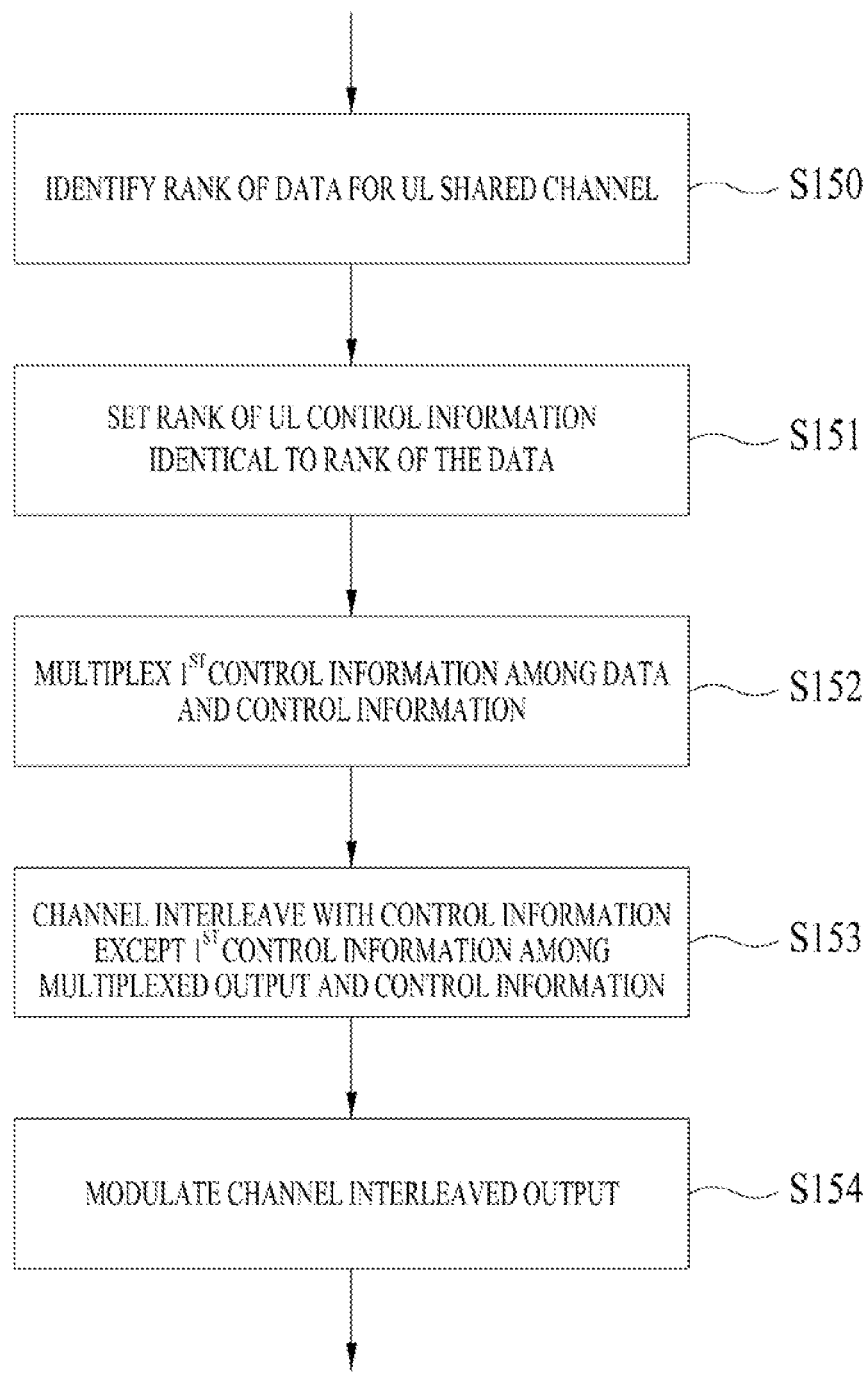
FIG. 11 is a flowchart for explaining a method of efficiently multiplexing a data and a control channel on an uplink shared channel.

FIG. 11 is a flowchart for explaining a method of efficiently multiplexing a data and a control channel on an uplink shared channel.

Referring to FIG. 11, a user equipment identifies a rank for a data of physical uplink shared channel (PUSCH) [S150]. And then, the user equipment sets a rank for an uplink control channel (in this case, the control channel means such an uplink control information (UCI) as CQI, ACK/NACK, RI and the like) with an identical rank, which is the same rank set to the data [S151]. And, the user equipment multiplexes the data and the control information, i.e., the CQI in a manner of being concatenated [S152]. And then, after the RI is mapped into a designated RE and the concatenated data and the CQI are mapped by the time-first scheme, a channel interleaving can be performed to help the ACK/NACK to be mapped in a manner of puncturing an RE situated in the vicinity of a DM-RS [S153].

Thereafter, the data and the control channel can be modulated to QPSK, 16QAM, 64QAM and the like according to an MCS table [S154]. In this case, the modulating step may move to a different position (for instance, the modulation block can be moved to a previous step of the multiplexing step of the data and the control channel). And, the channel interleaving can be performed by either a codeword unit or a layer unit.

Figure 12:
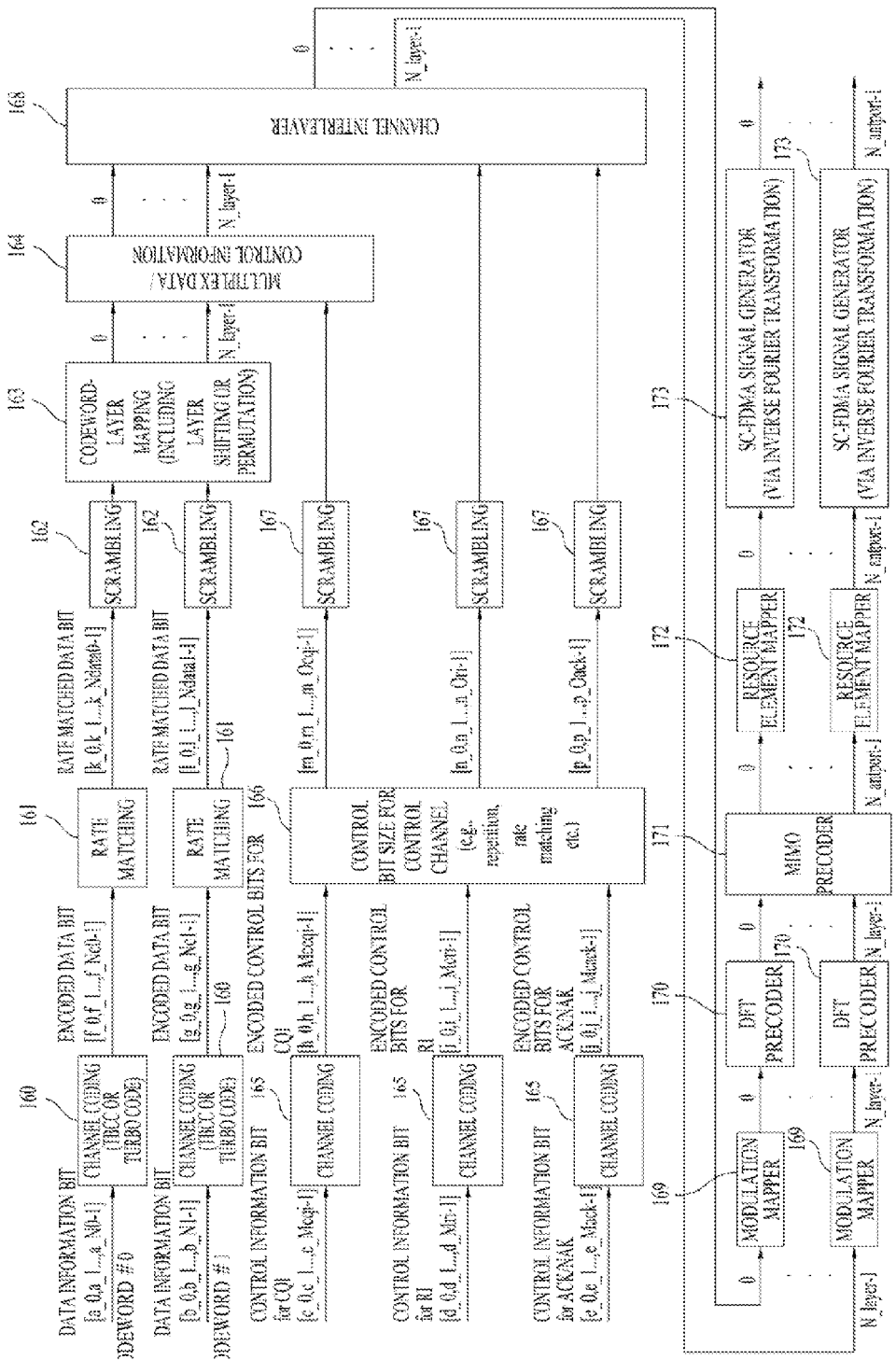
FIG. 12 is a block diagram for explaining a method of generating a transmission signal of a data and a control channel.

FIG. 12 is a block diagram for explaining a method of generating a transmission signal of a data and a control channel. The position of each block is able to change according to a scheme to which applied thereto.

Assume that there are two code words. A channel coding is performed according to each of the code words [S160]. A rate matching is performed according to a given MCS level and a size of a resource [S161]. And, encoded bits can be scrambled by cell-specifically, UE-specifically, or codeword-specifically [S162].

Thereafter, a codeword to layer mapping is performed [S163]. In this process, an operation of a layer shift or a permutation can be included.

Figure 13:
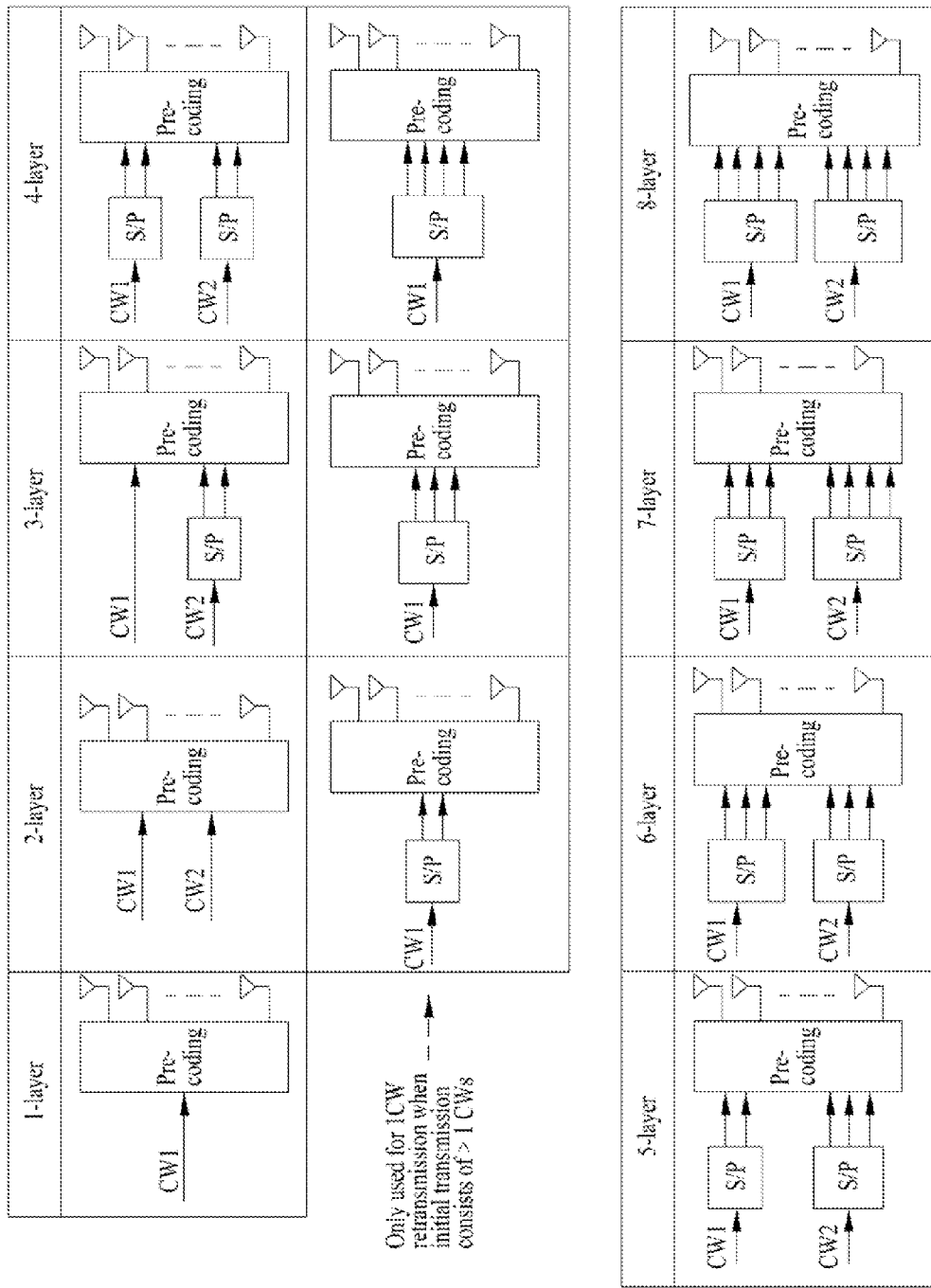
FIG. 13 is a diagram for explaining a method of mapping a codeword to a layer.

FIG. 13 is a diagram for explaining a method of mapping a codeword to a layer. The codeword to layer mapping can be performed using a rule depicted in FIG. 13.

Such control information as CQI, RI, and ACK/NACK is channel-coded according to a provided specification [S165]. In this case, the CQI, the RI, and the ACK/NACK can be coded using an identical channel code for all code words or can be coded using a different channel code according to a codeword.

And then, the number of encoded bit can be modified by a bit size control unit [S166]. The bit size control unit can be unified with a channel coding block [S165]. A signal outputted from the bit size control unit is scrambled [S167]. In this case, the scrambling can be performed by cell-specifically, layer-specifically, codeword-specifically, or UE-specifically.

The bit size control unit can operate as follows.

(1) The control unit identifies a rank (n_rank_pusch) of data for a PUSCH.

(2) A rank of a control channel (n_rank_control) is set to be identical to the rank of data (i.e., n_rank_control=n_rank_pusch), the number of bit for the control channel (n_bit_ctrl) expands its bit number in a manner of being multiplied by the rank of the control channel.

One method of performing this is to simply copy the control channel and repeat. In this case, the control channel may be an information level prior to a channel coding or may be a coded bit level after the channel coding. In particular, for instance, in case of a control channel [a0, a1, a2, a3], which is n_bit_ctrl=4 and the n_rank_pusch=2, an expanded bit number (n_ext_ctrl) may correspond to [a0, a1, a2, a3, a0, a1, a2, a3], which is 8 bits.

In case that the bit size control unit and a channel coding unit are configured to one unit, a coded bit can be generated in a manner of applying a channel coding defined by a legacy system (e.g., LTE Rel-8) and a rate matching.

In addition to the bit size control unit, a bit level interleaving can be performed to more randomize according to layers. Or, an interleaving can be performed in a modulated symbol level in order to provide an equivalent effect.

A CQI/PMI channel and data for 2 code words can be multiplexed by a data/control information multiplexer [S164]. And then, ACK/NACK information is mapped to both slots within a subframe in a manner of being mapped to the RE situated in the vicinity of UL DM-RS and a channel interleaver maps the CQI/PMI according to the time-first scheme [S168].

And, a modulation is performed according to each layer [S169], a DFT precoding [S170], a MIMO precoding [S171], an RE mapping [S172] and the like are sequentially performed. And, a SC-FDMA signal is then generated and transmitted via an antenna port [S173].

The functioning blocks are not limited to the position depicted in FIG. 12 and may change its position depending on a case. For instance, the scrambling blocks 162/167 can be positioned after a channel interleaving block. And, the codeword to layer matching block 163 can be positioned after the channel interleaving block 168 or a modulation mapper block 169.

According to FIG. 9 to FIG. 13, an example of mapping such an UL control information (UCI) as RI, ACK/NACK, and CQI together with a data in a current 3GPP LTE standard is depicted.

Figure 14:
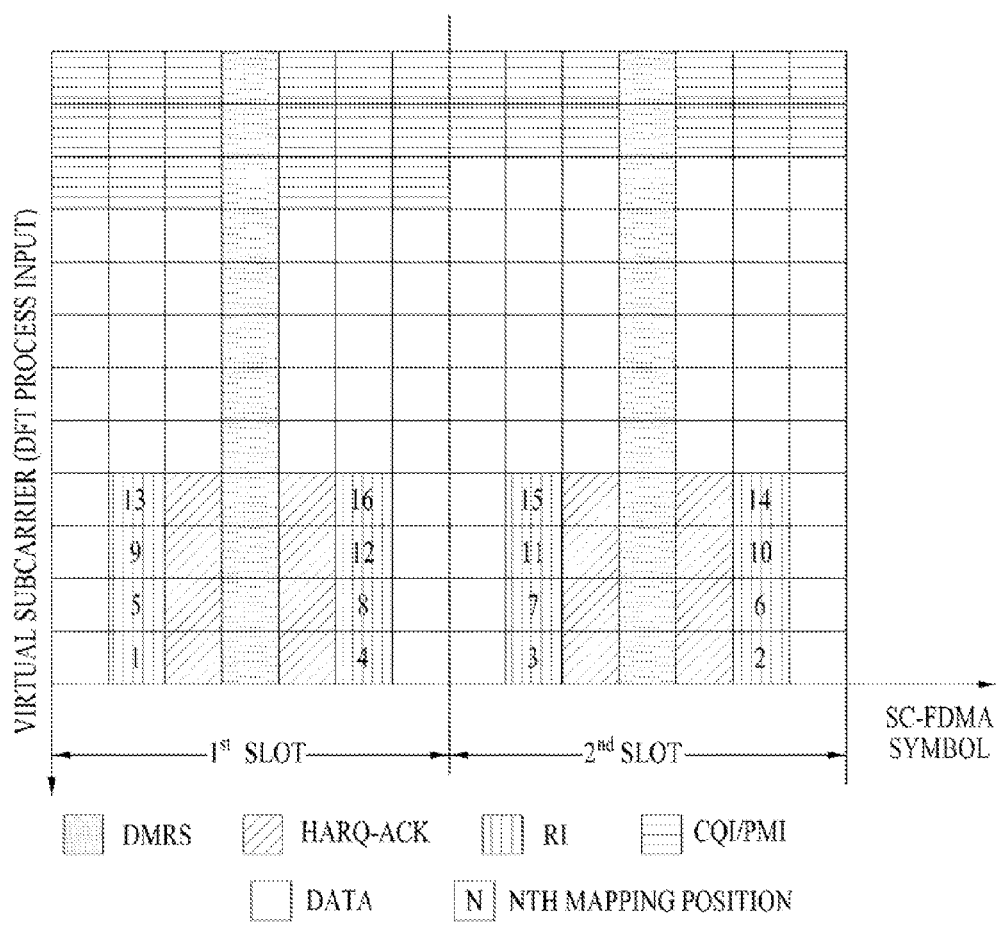
FIG. 14 is a diagram for an example of mapping a control information and a data to PUSCH in case that a normal CP is applied.
Figure 15:
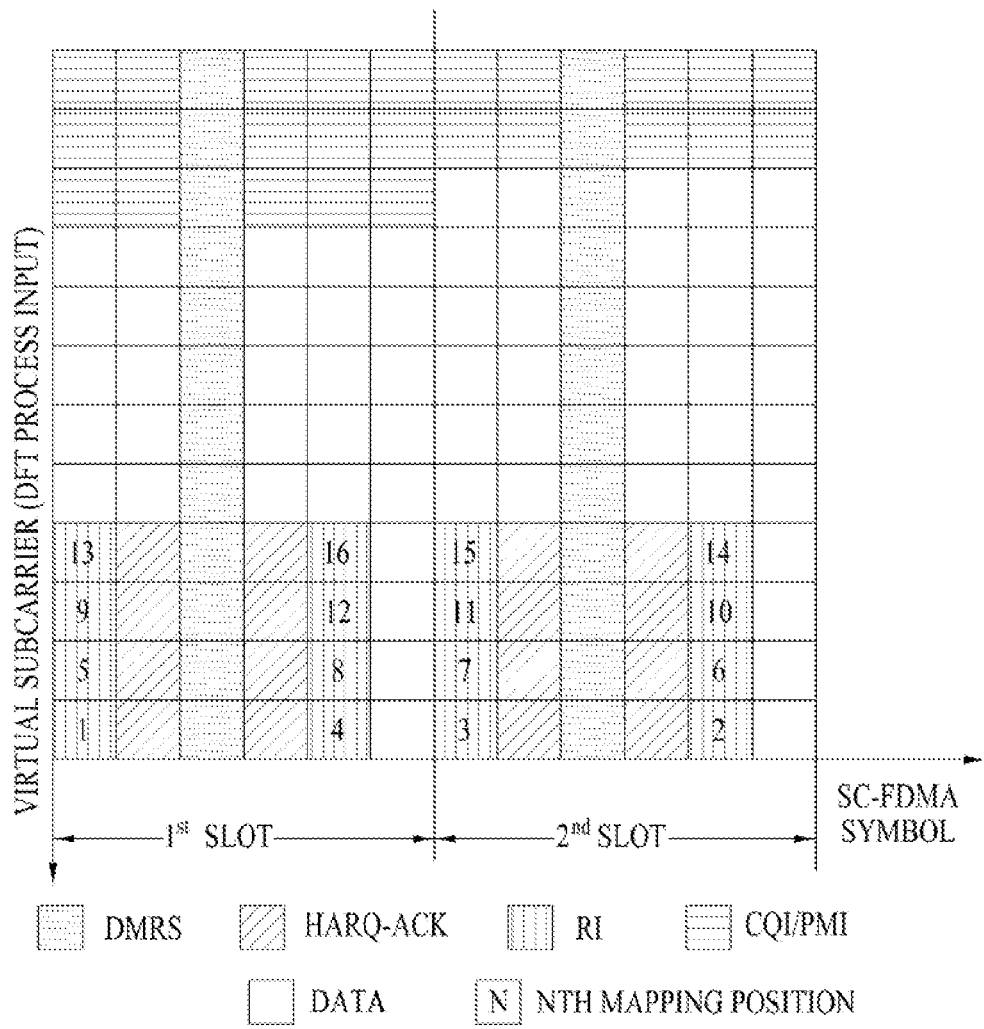
FIG. 15 is a diagram for an example of mapping a control information and a data to PUSCH in case that an extended CP is applied.

FIG. 14 is a diagram for an example of mapping a control information and a data to PUSCH in case that a normal CP is applied and FIG. 15 is a diagram for an example of mapping a control information and a data to PUSCH in case that an extended CP is applied. In particular, assume that the number of modulation symbol necessary for RI and ACK/NACK information is '16' and the number of modulation symbol necessary for CQI/PMI information is '30'.

Referring to FIG. 14, it is able to aware that the RI information is mapped to the symbol index 1, 12, 8, and 5 by a time-first mapping scheme. Referring to FIG. 15, the RI information is mapped to the symbol index 0, 10, 6, and 4 by the time-first mapping scheme.

The present invention proposes a method of efficiently transmitting multiple RI (rank indication) information on PUSCH.

1$^{st}$ Embodiment

First of all, a method of transmitting the multiple RI is explained in a 1st embodiment of the present invention in case that a CoMP scheme is applied.

In case that a serving eNode B (S-eNB) and (N−1) number of coordinating eNode B (C-eNB) are participating in a CoMP transmission, it is preferable that a UE generates and transmits CSI information (i.e., CQI, PMI, and RI) on the N number of eNBs including the S-eNB and the C-eNB for an efficient CoMP operation.

Figure 16:
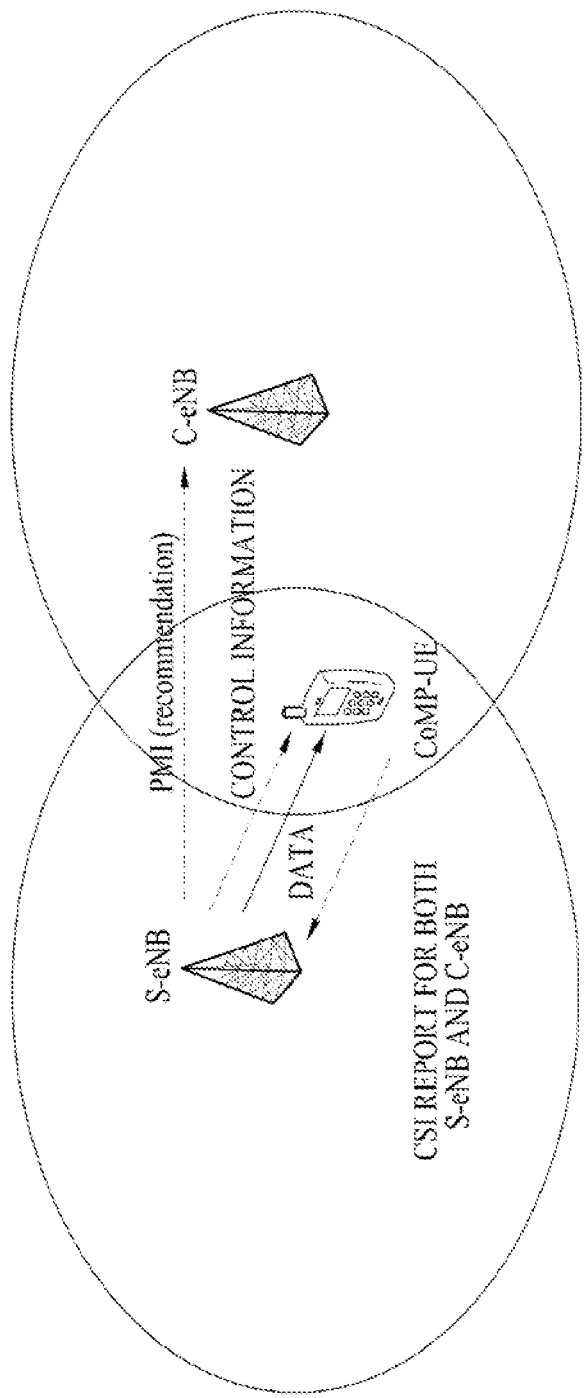
FIG. 16 is a diagram for an example of a communication system to which a CB (coordinated beamforming) is applied among CoMP scheme capable of being applied by a $1^{st}$ embodiment of the present invention.

FIG. 16 is a diagram for an example of a communication system to which a CB (coordinated beamforming) is applied among CoMP scheme capable of being applied by a $1^{st}$ embodiment of the present invention.

Referring to FIG. 16, a CoMP-UE, i.e., a UE works in a manner of receiving a control information from an S-eNB and a data is received only from the S-eNB as well. The CoMP-UE performs a channel estimation for a radio channel of a C-eNB as well as the S-eNB, generates CSI information according to a corresponding eNB, and then transmit the CSI information to the S-eNB.

The S-eNB performs a PMI recommendation operation, which corresponds to the operation delivering PMI information capable of minimizing interference from the C-eNB(s) in case of performing a communication between the S-eNB and the C-eNB, based on the radio channel information on the S-eNB and the radio channel information on the C-eNB(s). Having received the aforementioned information, the C-eNB applies a precoding in a manner of utilizing the PMI information received from the S-eNB, i.e., the recommended PMI to minimize the interference, which may affect the CoMP-UE.

As an example of a method of transmitting the CSI information of the CoMP-UE, a periodic CSI report on PUCCH is performed for the S-eNB and an aperiodic CSI report on PUSCH can be performed for the C-eNB. If the periodic CSI report for the S-eNB and the aperiodic CSI report for the C-eNB are taking place in an identical subframe at the same time, a following method can be applied.

1) a periodic CSI report, for instance, in a situation that the periodic CSI report on PUCCH for the S-eNB is currently performed, if a pre-defined aperiodic CSI report of a special purpose, i.e., the aperiodic CSI report for the C-eNB(s) on PUSCH is transmitted in an identical subframe, it may be able to configure the periodic CSI report on PUCCH and the aperiodic CSI report on PUSCH to be performed at the same time only for the present case. Yet, it is preferable to perform the aperiodic CSI report only in a manner of omitting the periodic CSI report except a case that the pre-defined aperiodic CSI report of a special purpose is transmitted.

2) a periodic CSI report, for instance, in a situation that the periodic CSI report on PUCCH for the S-eNB is currently performed, if a pre-defined aperiodic CSI report of a special purpose, i.e., the aperiodic CSI report for the C-eNB(s) on PUSCH is transmitted in an identical subframe, the periodic CSI information is transmitted together with the aperiodic CSI information in a manner of piggybacking the periodic CSI information on PUSCH. This is a different point from a case that a UE of 3GPP LTE system generally perform an aperiodic CSI report only in case that a periodic CSI report and the aperiodic CSI report are taking place in an identical subframe at the same time.

The CoMP-UE may be able to efficiently perform a CSI report under a CoMP situation in a manner of transmitting periodic CSI information together with aperiodic CSI information by piggybacking the periodic CSI information on PUSCH.

In case that a periodic CSI information is transmitted together with an aperiodic CSI information in a manner of piggybacking the periodic CSI information on PUSCH via the aforementioned 2) scheme, the present invention proposes a method of efficiently transmitting multi RI information on PUSCH described in the following A) to C) description. The aforementioned CSI information transmission method of the CoMP-UE corresponds to one example to which the proposed method is applicable. For clarity, the proposed method is described on the basis of a CoMP environment in the following description. And, although the proposed method is described based on a 3GPP LTE system for clarity of explanation, it is apparent that the proposed method is expandable to a different communication system as well.

A) First of all, after preferentially mapping aperiodic RI information to a symbol index, which is preconfigured for RI information in PUSCH region, it is able to consider mapping periodic RI information by a time-first scheme with a same manner of a case of the aperiodic RI information. In this case, the maximum number of (modulation) symbol is limited to $4 \times M_{sc}^{PUSCH}$. $M_{sc}^{PUSCH}$ indicates a bandwidth scheduled for PUSCH transmission of a transport block in a current subframe and represented by the number of subcarrier.

Figure 17:
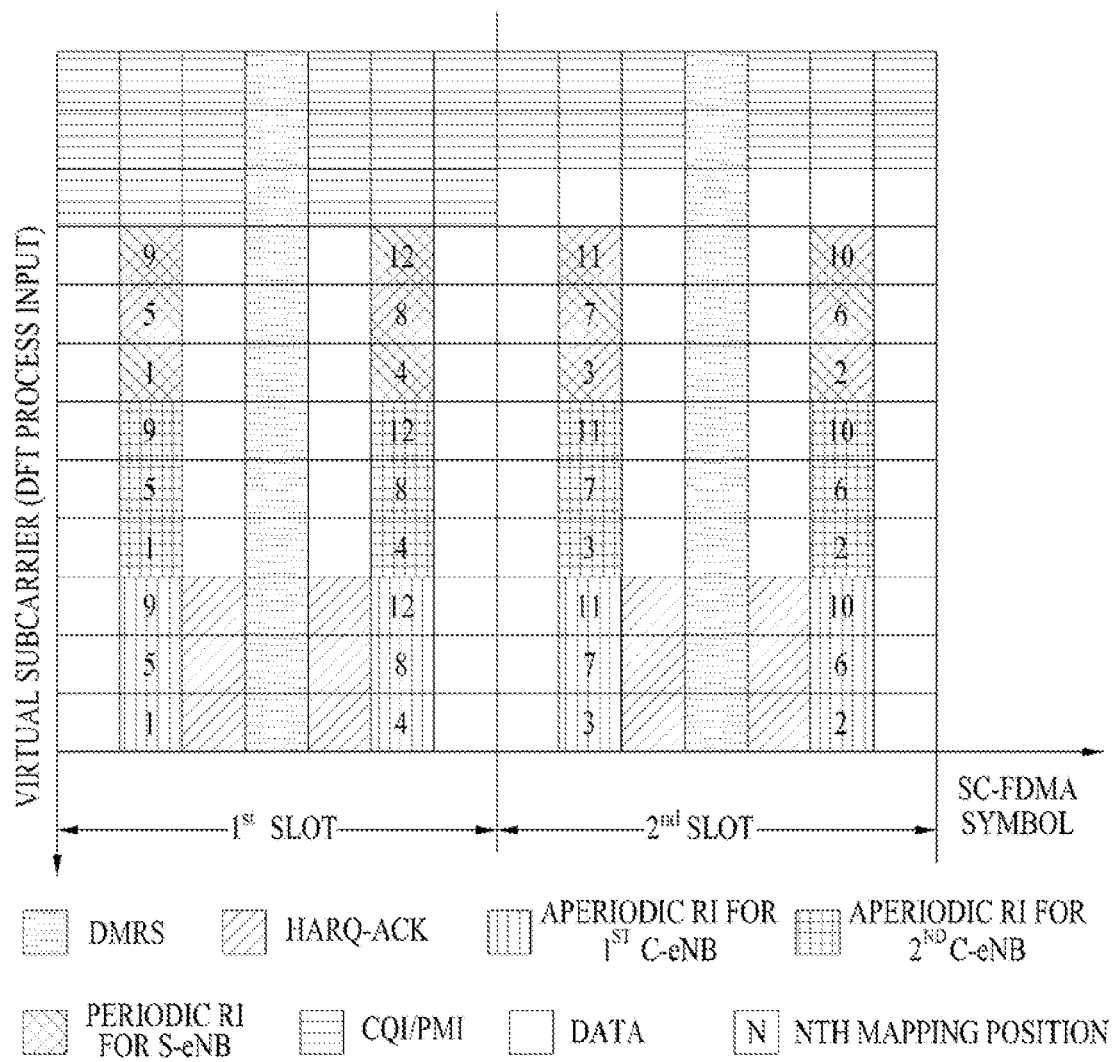
FIG. 17 and FIG. 18 are diagrams for an example of mapping multiple RI informations to PUSCH according to a $1^{st}$ embodiment of the present invention in case that a normal CP and an extended CP are applied, respectively.
Figure 18:
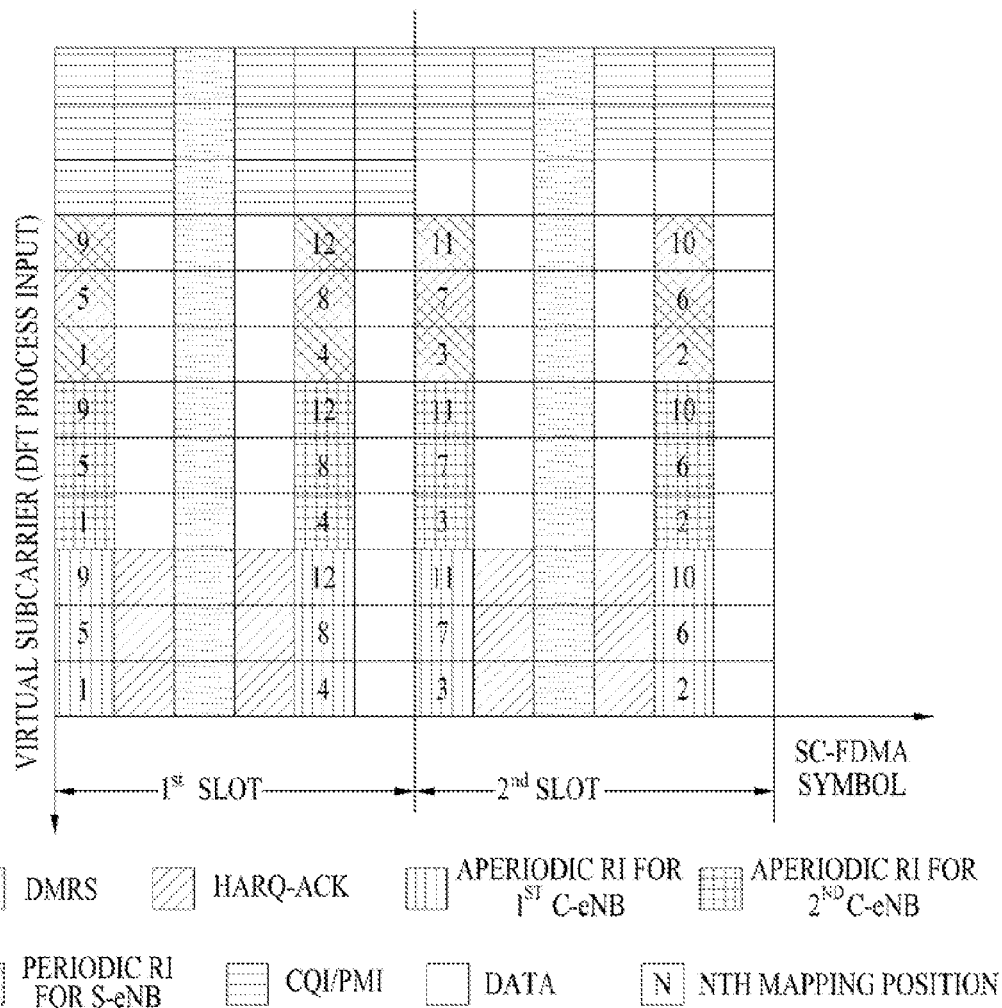

FIG. 17 and FIG. 18 are diagrams for an example of mapping multiple RI informations to PUSCH according to a $1^{st}$ embodiment of the present invention in case that a normal CP and an extended CP are applied, respectively. In particular, it is assumed a situation that an S-eNB and two C-eNBs are participating in a CoMP in FIG. 17 and FIG. 18 and the number of modulation symbol necessary for the RI information of the S-eNB and the two C-eNBs identically corresponds to 12, respectively. And, it is also assumed that the number of modulation symbol necessary for CQI/PMI information and ACK/NACK information corresponds to 30 and 12, respectively.

Referring to FIG. 17, it is able to aware that the aperiodic RI information for a $1^{st}$ C-eNB, the aperiodic RI information for a $2^{nd}$ C-eNB, and the periodic RI information for the S-eNB are sequentially allocated to the resource elements corresponding to the symbol index 1, 12, 8, and 5 by the time-first mapping scheme.

And, referring to FIG. 18, it is able to aware that the aperiodic RI information for the $1^{st}$ C-eNB, the aperiodic RI information for the $2^{nd}$ C-eNB, and the periodic RI information for the S-eNB are sequentially allocated to the resource elements corresponding to the symbol index 0, 10, 6, and 4 by the time-first mapping scheme.

B) After preferentially mapping CQI/PMI information to PUSCH region, it is able to consider mapping periodic RI information with a same manner of the CQI/PMI information prior to a data mapping. In particular, a mapping is sequentially performed in CQI/PMI, RI, and data order. The aperiodic RI information is mapped to a symbol index, which is pre-defined for mapping the RI information. In this case, the maximum number of a modulation symbol is limited to $M_{sc}^{PUSCH} \times N_{symb}^{PUSCH} - Q_{RI}/Q_m$. $M_{sc}^{PUSCH}$ indicates a bandwidth scheduled for PUSCH transmission of a transport block in a current subframe and represented by the number of subcarrier. And, $N_{symb}^{PUSCH}$ means the number of symbol capable of delivering PUSCH in a subframe, $Q_m$ means a modulation order, and $Q_{RI}$ means the total bit numbers of encoded RIs.

Figure 19:
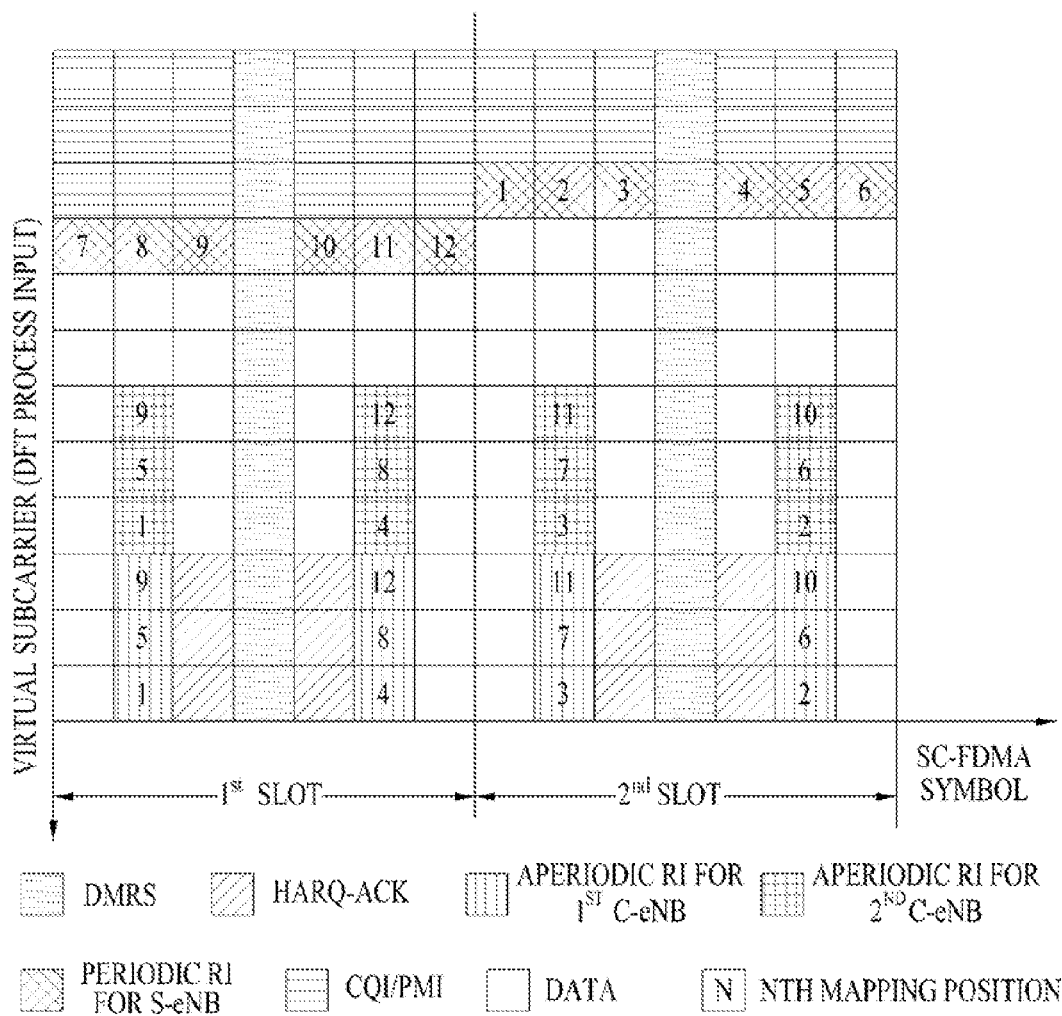
FIG. 19 and FIG. 20 are different diagrams for an example of mapping multiple RI informations to PUSCH according to a $1^{st}$ embodiment of the present invention in case that a normal CP and an extended CP are applied, respectively.
Figure 20:
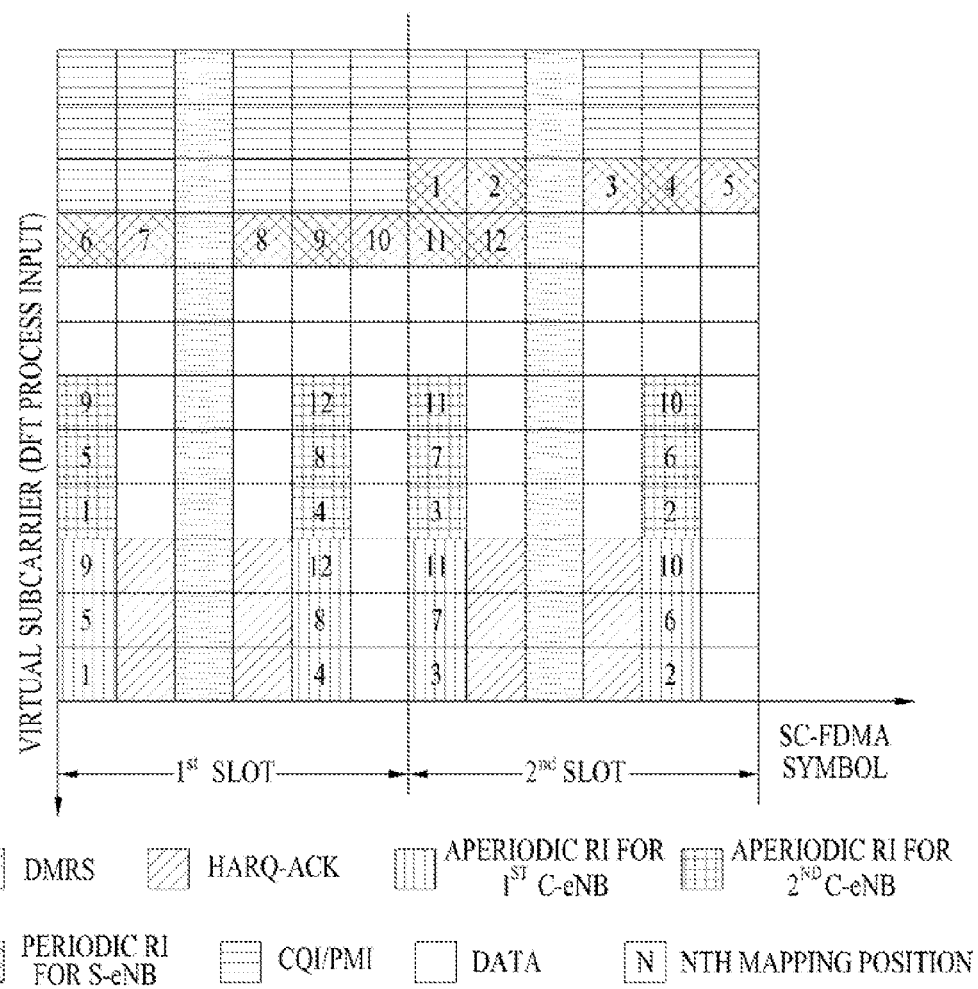

FIG. 19 and FIG. 20 are different diagrams for an example of mapping multiple RI informations to PUSCH according to a $1^{st}$ embodiment of the present invention in case that a normal CP and an extended CP are applied, respectively.

Referring to FIG. 19, it is able to aware that periodic CSI information is mapped after CQI/PMI is mapped. And, it is able to aware that the aperiodic RI information for the $1^{st}$ C-eNB and the aperiodic RI information for the $2^{nd}$ C-eNB are sequentially allocated to the resource elements corresponding to the symbol index 1, 12, 8, and 5 by the time-first mapping scheme.

And, referring to FIG. 20, it is able to aware that periodic CSI information is mapped after CQI/PMI is mapped. And, it is able to aware that the aperiodic RI information for the 1$^{st}$ C-eNB and the aperiodic RI information for the 2$^{nd}$ C-eNB are sequentially allocated to the resource elements corresponding to the symbol index 0, 10, 6, and 4 by the time-first mapping scheme.

C) Lastly, after performing a joint encoding on the periodic RI information and the aperiodic RI information, maps it to a symbol index, which is pre-defined for mapping an RI information. In this case, the maximum number of (modulation) symbol is limited to 4×$M_{sc}^{PUSCH}$. $M_{sc}^{PUSCH}$ indicates a bandwidth scheduled for PUSCH transmission of a transport block in a current subframe and represented by the number of subcarrier.

Figure 21:
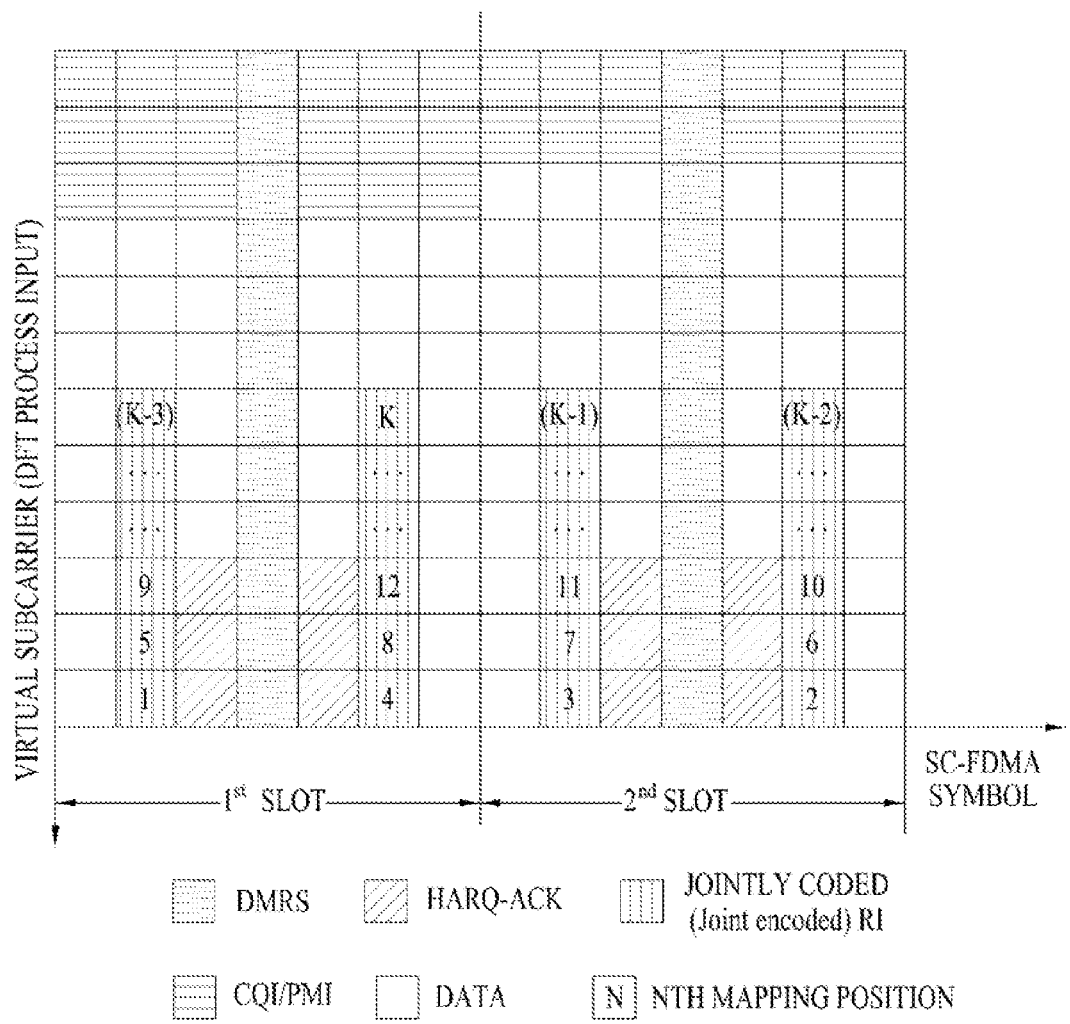
FIG. 21 and FIG. 22 are further different diagrams for an example of mapping multiple RI informations to PUSCH according to a $1^{st}$ embodiment of the present invention in case that a normal CP and an extended CP are applied, respectively.
Figure 22:
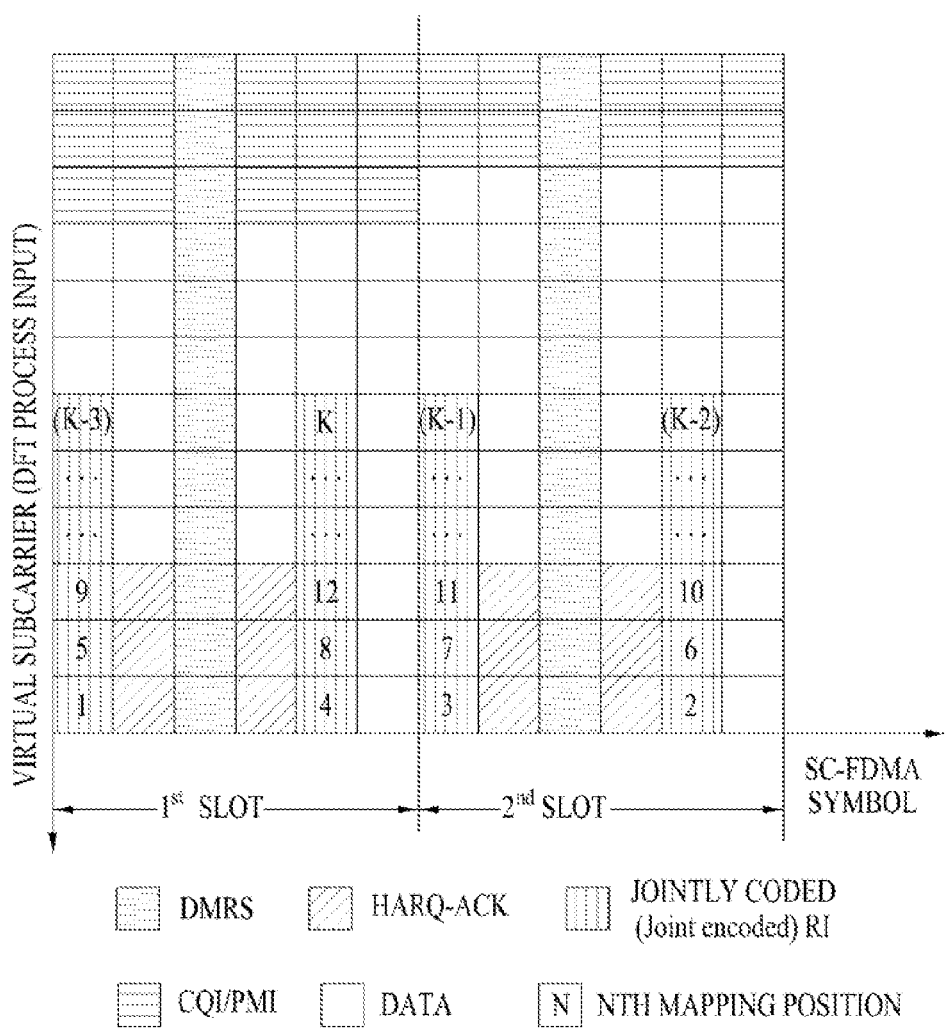

FIG. 21 and FIG. 22 are further different diagrams for an example of mapping multiple RI informations to PUSCH according to a 1$^{st}$ embodiment of the present invention in case that a normal CP and an extended CP are applied, respectively. In particular, assume the number of modulation symbol, which is required as a result of performing a joint encoding on periodic RI information for an S-eNB, (aperiodic) RI information for a 1$^{st}$ C-eNB, and (aperiodic) RI information for a 2$^{nd}$ C-eNB, corresponds to K. And, it is also assumed that the number of modulation symbol necessary for CQI/PMI information and ACK/NACK information corresponds to 30 and 12, respectively.

Referring to FIG. 21, it is able to aware that a jointly encoded RI information is sequentially allocated to the K symbols in the order of symbol index 1, 12, 8, and 5 by a time-first scheme. And, referring to FIG. 22, it is able to aware that a jointly encoded RI information is sequentially allocated to the K symbols in the order of symbol index 0, 10, 6, and 4 by a time-first scheme.

Characteristics described in the A) to C) can also be applicable to a situation that RI informations for each component carrier are transmitted together in case that a carrier aggregation scheme is applied.

2$^{nd}$ Embodiment

According to a 2$^{nd}$ embodiment of the present invention, there exist an explanation on a method of expanding and applying the aforementioned 1$^{st}$ embodiment in case that a CoMP scheme is applied according to each component carrier in an environment to which a carrier aggregation technology is applied.

Figure 23:
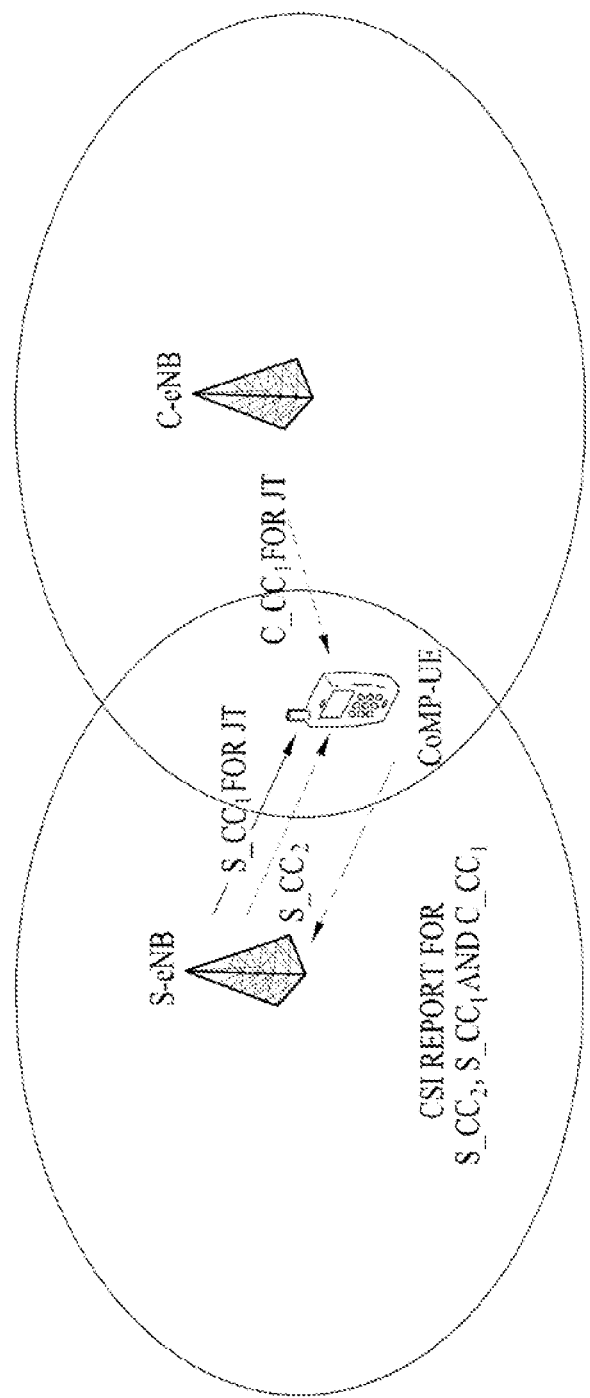
FIG. 23 is a diagram for explaining an example to which a $2^{nd}$ embodiment of the present invention is applied in a wireless communication system where a carrier aggregation scheme is applied.

FIG. 23 is a diagram for explaining an example to which a 2$^{nd}$ embodiment of the present invention is applied in a wireless communication system where a carrier aggregation scheme is applied. In particular, FIG. 23 assumes a case that an S-eNB and a C-eNB configure 2 component carriers, respectively. In particular, an $S\_CC_1$ and an $S\_CC_2$ are configured in the S-eNB and a $C\_CC_1$ and a $CC\_C_2$ (not depicted) are configured in the C-eNB.

Referring to FIG. 23, the $S\_CC_1$ of the S-eNB and the $C\_CC_1$ of the C-eNB are used for a joint transmission (JT), which is one of the CoMP scheme, and the $S\_CC_2$ of the S-eNB is used for a general operation, i.e., a non-CoMP operation simultaneously. In this case, a CoMP UE performs channel estimation for a radio channel of the $S\_CC_1$ of the S-eNB and that of the $C\_CC_1$ of the C-eNB as well as that of the $S\_CC_2$ of the S-eNB and then delivers CSI information to the S-eNB according to each of the CCs.

As an example of a method of transmitting the CSI information, a periodic CSI report for the $S\_CC_2$ of the S-eNB used for a non-CoMP operation and an aperiodic CSI report for the $S\_CC_1$ and the $C\text{-}CC_1$ used for a JT can be performed. Or, the periodic CSI report is performed for the $S\_CC_1$ and the $S\_CC_2$, which correspond to the component carriers of the S-eNB and the aperiodic CSI report can be performed for the $C\_CC_1$, which corresponds to the component carrier of the C-eNB.

In case that the CSI information is transmitted by the CoMP UE using the aforementioned transmission schemes, if the periodic CSI report and the aperiodic CSI report are simultaneously taking place in an identical subframe, it is preferable to transmit the periodic CSI information together with the aperiodic CSI information in a manner of piggy backing the periodic CSI information on PUSCH.

Figure 24:
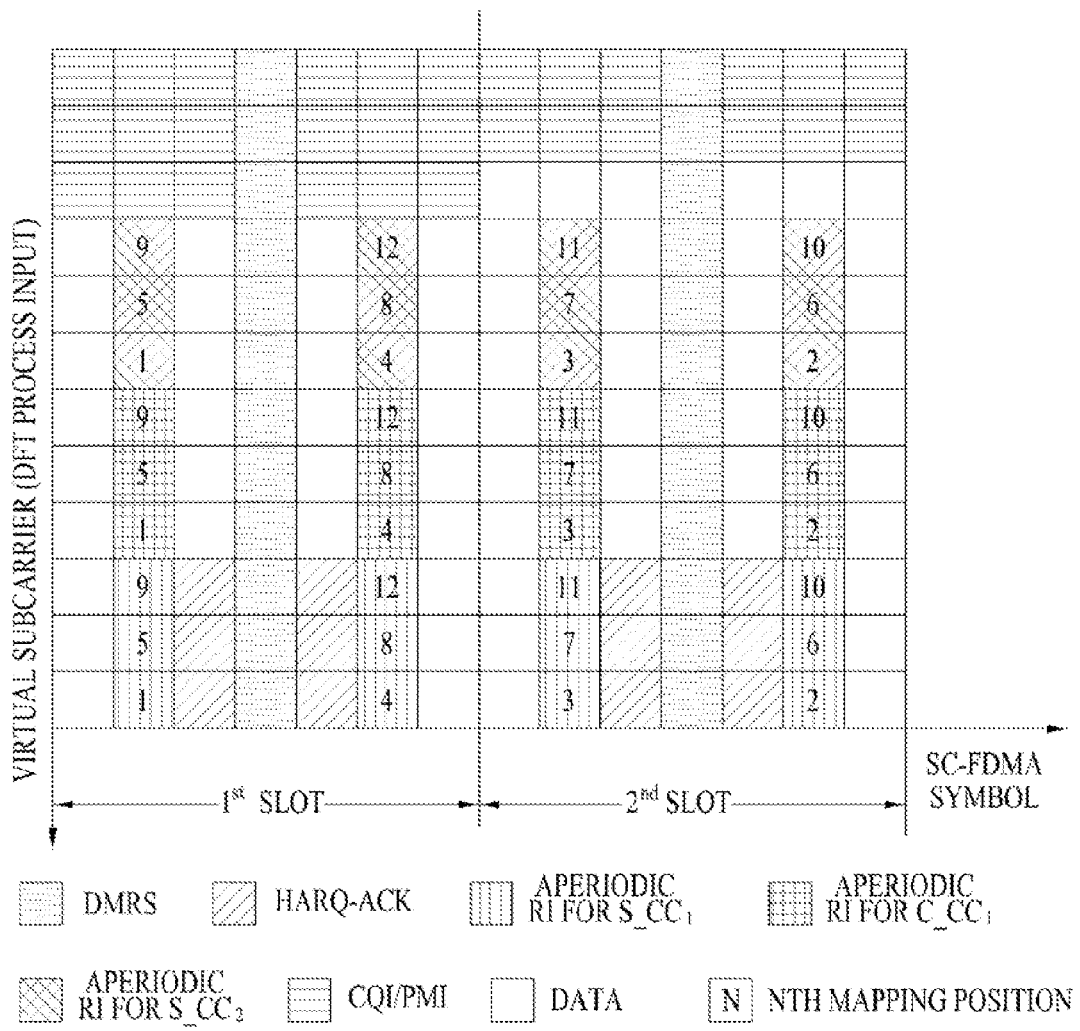
FIG. 24 to FIG. 26 are diagrams for an example of mapping multiple RI informations to PUSCH according to a $2^{nd}$ embodiment of the present invention in case that a normal CP is applied.
Figure 25:
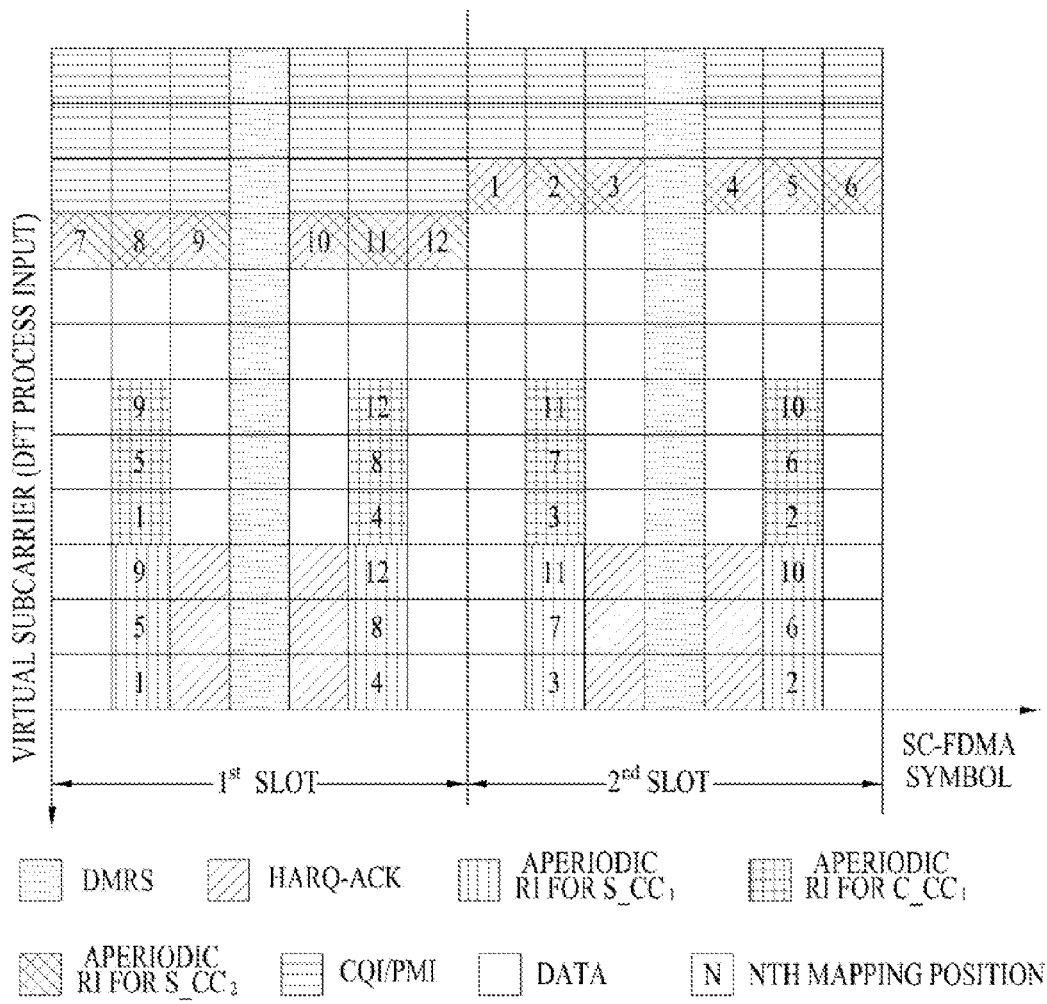
Figure 26:
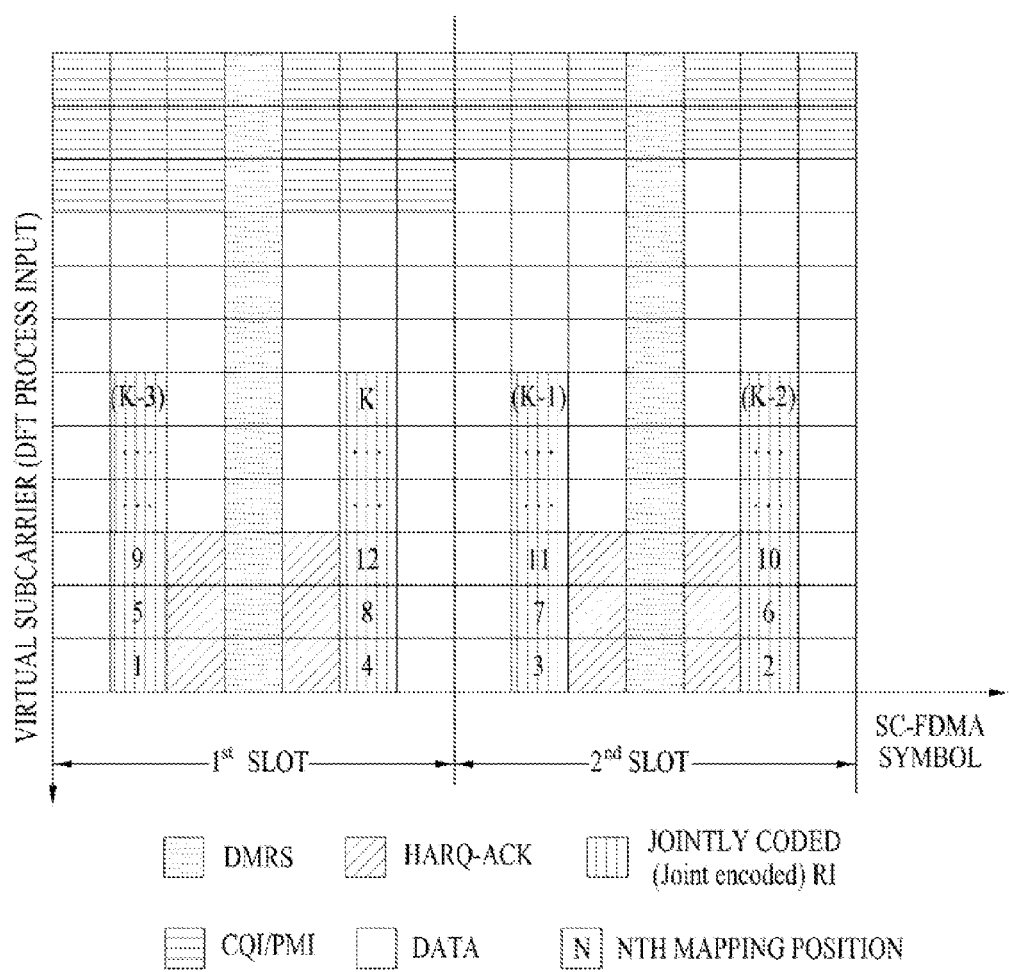

FIG. 24 to FIG. 26 corresponds to diagrams for an example of mapping multiple RI informations to PUSCH according to a 1$^{st}$ embodiment of the present invention in case that a normal CP is applied. In particular, FIG. 24 correspond to a case that A) of the aforementioned 1$^{st}$ embodiment is expanded and applied, FIG. 25 correspond to a case that B) of the aforementioned 1$^{st}$ embodiment is expanded and applied, and FIG. 26 correspond to a case that C) of the aforementioned 1$^{st}$ embodiment is expanded and applied. Similarly, it is assumed that the number of modulation symbol necessary for RI information according to the component carrier of the S-eNB and the C-eNB identically corresponds to 12. And, it is assumed that the number of modulation symbol necessary for CQI/PMI information and ACK/NACK information correspond to 30 and 12, respectively.

And, in FIG. 24 to FIG. 26, assume that a periodic CSI report is performed for the $S\_CC_2$ of the S-eNB used for a non-CoMP operation and an aperiodic CSI report is performed for the $S\text{-}CC_1$ and the $C\_CC_1$, which are used for a JT.

Referring to FIG. 24, it is able to aware that aperiodic RI information for the $S\_CC_1$, aperiodic RI information for the $C\_CC_1$, and periodic RI information for the $S\_CC_2$ are sequentially allocated to resource elements corresponding to symbol index 1, 12, 8, and 5 by a time-first mapping scheme.

Referring to FIG. 25, it is able to aware that the periodic CSI information for the $S\_CC_2$ is mapped after CQI/PMI is mapped and the aperiodic RI information for the $S\_CC_1$ and the aperiodic RI information for the $C\_CC_1$ are sequentially mapped to the resource elements corresponding to the symbol index 1, 12, 8, and 5 by the time-first scheme.

Lastly, referring to FIG. 26, if it is assumed that the number of modulation symbol, which is required as a result of performing a joint encoding on the aperiodic RI information for the $S\_CC_1$, the aperiodic RI information for the $C\_CC_1$, and the periodic RI information for the $S\_CC_2$, corresponds to K, it is able to aware that the jointly encoded RI information is sequentially allocated to the K number of symbols in the order of symbol index 1, 12, 8, and 5 by the time-first mapping scheme.

3$^{rd}$ Embodiment

According to a 3$^{rd}$ embodiment of the present invention, in case that multiple RI information are mapped to PUSCH using the aforementioned A) scheme in a situation that there exist a plurality of component carriers configured to each of eNBs, in other word, in case that the periodic RI information is mapped with a scheme identical to that of the aperiodic RI information by the time-first scheme after preferentially mapping the aperiodic RI information to the symbol index, which is pre-defined for the RI information in PUSCH region, a mapping order is defined in the following a) to c) description.

In the following description, 'i' indicates an eNB index (1≤i≤N) for the N number of eNBs participating in a CoMP operation and 'j' (i) indicates a CC index of an eNB(i). 'i' and the 'j' correspond to positive integer values greater than '0' (or, integer value not a negative).

And, assume that eNB (1) and 'j (1)=a' correspond to the CCs used for an operation of the S-eNB and a non-CoMP, respectively and the rest of CCs except the aforementioned eNB (1) and 'j (1)=a' are used for CoMP operation. In addition, assume a situation that periodic CSI information is piggy backed on PUSCH in a manner that an aperiodic CSI report, e.g., a CSI report of a CC for the CoMP operation simultaneously occurs in an identical subframe in the middle of transmitting a CSI report on the 'j (1)=a' as a periodic CSI report.

a) First of all, after mapping RI informations per CC of the eNB (i) to the j (i) in ascending order and then the RI informations per CC of eNB (i+1) are mapped. In this case, the RI informations per CC of the eNB (i+1) are mapped to the j (i) in ascending order similar to the process of the eNB (i).

b) Or, first of all, after mapping the RI informations per CC of the eNB (i) to the rest of j (i) except the case of 'j (1)=a' (in particular, the CC on which the periodic report of the S-eNB (i.e., eNB (1)) is performed) in ascending order, it is able to consider mapping the RI informations per CC of the eNB (i+1). In this case, the RI informations per CC of the eNB (i+1) are mapped to the rest of j (i) except the case of 'j(1)=a' in ascending order, which is identical to the process of the eNB (i). After completing the aforementioned process, the RI information on the 'j (1)=a' is mapped at the end.

C) Lastly, after mapping the RI information of the eNB (i) to an eNB index i in ascending order under a fixed CC index j (i) (1≤i≤N) and then goes on a case of a next CC index j (i)+1. Similar to the process of the j (i), in case of the j (i)+1, the RI information of the eNB (i) is mapped to the eNB index i in ascending order under a fixed CC index j (i)+1 (1≤i≤N). In this case, if the aforementioned a) to c) scheme is applied to a system, it is preferable for an S-eNB to signal the eNB index of both the S-eNB and C-eNBs and the information on a component carrier index per eNB to a CoMP UE via a higher layer signaling or a physical layer signaling transmitted on PDCCH or PDSCH.

And, according to the aforementioned a) to c) scheme, it is possible to map CSI information to the eNB index or a CC index in descending order.

A following Table 1 indicates an example of mapping according to each mapping order of the a) to c) scheme in a situation of FIG. 23. FIG. 23 corresponds to a situation that an S-eNB and a C-eNB configure 2 component carriers, respectively. In particular, an $S\_CC_1$ and an $S\_CC_2$ are configured in the S-eNB and a $C\_CC_1$ and a $CC\_C_2$ (not depicted) are configured in the C-eNB. The $S\_CC_1$ of the S-eNB and the $C\_CC_1$ of the C-eNB are used for a joint transmission (JT) (aperiodic CSI report), which is one of the CoMP scheme, and the $S\_CC_2$ of the S-eNB is used for a general operation, i.e., a non-CoMP operation simultaneously.

TABLE 1

| | Mapping Order | | |
|---|---|---|---|
| Option | $1_{st}$ | $2_{nd}$ | $3_{rd}$ |
| a) | $S\_CC_1$ | $S\_CC_2$ | $C\_CC_1$ |
| b), c) | $S\_CC_1$ | $C\_CC_1$ | $S\_CC_2$ |

Referring to Table 1, in case that b) and c) scheme are applied, the RI information on the $S\_CC_2$ is mapped at the end and this is for a CC of a non-CoMP operation. And, the Table 1 of a) to c) assumes a situation that an index of the C-eNB is greater than an index of the S-eNB.

A following Table 2 indicates an example of mapping according to each mapping order of the a) to c) scheme in a following situation. The situation may correspond to a situation that 3 CCs, such as an $S\_CC_1$, an $S\_CC_2$, and an $S\_CC_3$ are configured in the S-eNB and 3 CCs such as a $C\_CC_1$, a $CC\_C_2$, and a $C\_CC_3$ are configured in the C-eNB. The $S\_CC_1$ of the S-eNB and the $C\_CC_1$ of the C-eNB are used for a JT (aperiodic CSI report), the $S\_CC_2$ and the $C\-CC_2$ are used for a CB (aperiodic CSI report), and the $S\_CC_3$ is used for a non-CoMP operation (periodic CSI report).

TABLE 2

| | Mapping Order | | | | |
|---|---|---|---|---|---|
| Option | $1_{st}$ | $2_{nd}$ | $3_{rd}$ | $4_{th}$ | $5_{th}$ |
| a) | $S\_CC_1$ | $S\_CC_2$ | $S\_CC_3$ | $C\_CC_1$ | $C\_CC_2$ |
| b) | $S\_CC_1$ | $S\_CC_2$ | $C\_CC_1$ | $C\_CC_2$ | $S\_CC_3$ |
| c) | $S\_CC_1$ | $C\_CC_1$ | $S\_CC_2$ | $C\_CC_2$ | $S\_CC_3$ |

In particular, the Table 2 of a) to c) assumes a situation that an index of the C-eNB is greater than an index of the S-eNB.

Lastly, Table 3 indicates an example of mapping according to each mapping order of a) to c) scheme in a following situation. The situation may correspond to a situation that 2 CCs such as an $S\_CC_1$ and an $S\_CC_2$ are configured in the S-eNB and 2 (or more) CCs such as a $C\_CC_1$ and a $CC\_C_2$ are configured in the C-eNB. The $S\_CC_1$ and the $C\_CC_1$ are used for a JT (aperiodic CSI report) and the $S\_CC_2$ and the $C\_CC_2$ are used for a CB (aperiodic CSI report). Under this situation, a CoMP UE may be able to transmit all of the CSI information per CC to the S-eNB on PUSCH.

TABLE 3

| | Mapping Order | | | |
|---|---|---|---|---|
| Option | $1_{st}$ | $2_{nd}$ | $3_{rd}$ | $4_{th}$ |
| a), b) | $S\_CC_1$ | $S\_CC_2$ | $C\_CC_1$ | $C\_CC_2$ |
| c) | $S\_CC_1$ | $C\_CC_1$ | $S\_CC_2$ | $C\_CC_2$ |

In particular, the Table 3 of a) to c) assumes a situation that an index of the C-eNB is greater than an index of the S-eNB.

The aforementioned mapping order a) to c) can be applied to the mapping method B), i.e., after preferentially mapping CQI/PMI information to PUSCH region, mapping periodic RI information with a same manner of the CQI/PMI information prior to a data mapping.

And, the mapping order a) to c) may apply to the cases that all of the CSI information for the CCs of the S-eNB are reported as a periodic CSI and the CSI information for the CoMP CCs of the C-eNB are reported as an aperiodic CSI. Moreover, the mapping order a) to c) may apply to a case that all of the CCs of the S-eNB and the C-eNB are reported as the aperiodic CSI as well.

Although the RI information is described in the foregoing description, the mapping order a) to c) can be applied to the aforementioned both schemes of transmitting CSI information, in particular, 1) if a pre-defined aperiodic CSI report of a special purpose is transmitted in an identical subframe, a scheme of simultaneously performing a periodic CSI report on PUCCH and an aperiodic CSI report on PUSCH at the same time and 2) a scheme of transmitting periodic CSI information together with aperiodic CSI information in a manner of piggy backing the periodic CSI information on PUSCH.

The aforementioned A) to C) scheme for piggy backing the periodic CSI information on PUSCH and the mapping order a) to c) can be applied to not only a case that a CoMP UE simultaneously performs an RI report for a C-eNB and an RI report for an S-eNB but also a case that the CoMP UE reports RIs for the S-eNB only. In this case, an aperiodic CSI report for the C-eNB transmits CQI/PMI except RI and the RI information on the C-eNB can be shared by the S-eNB and the C-eNB with each other.

And, it is apparent that the aforementioned embodiments can be applied to a situation of reporting multiple CSI information in various communication environments as well as the case to which the CoMP scheme is applied.

Figure 27:
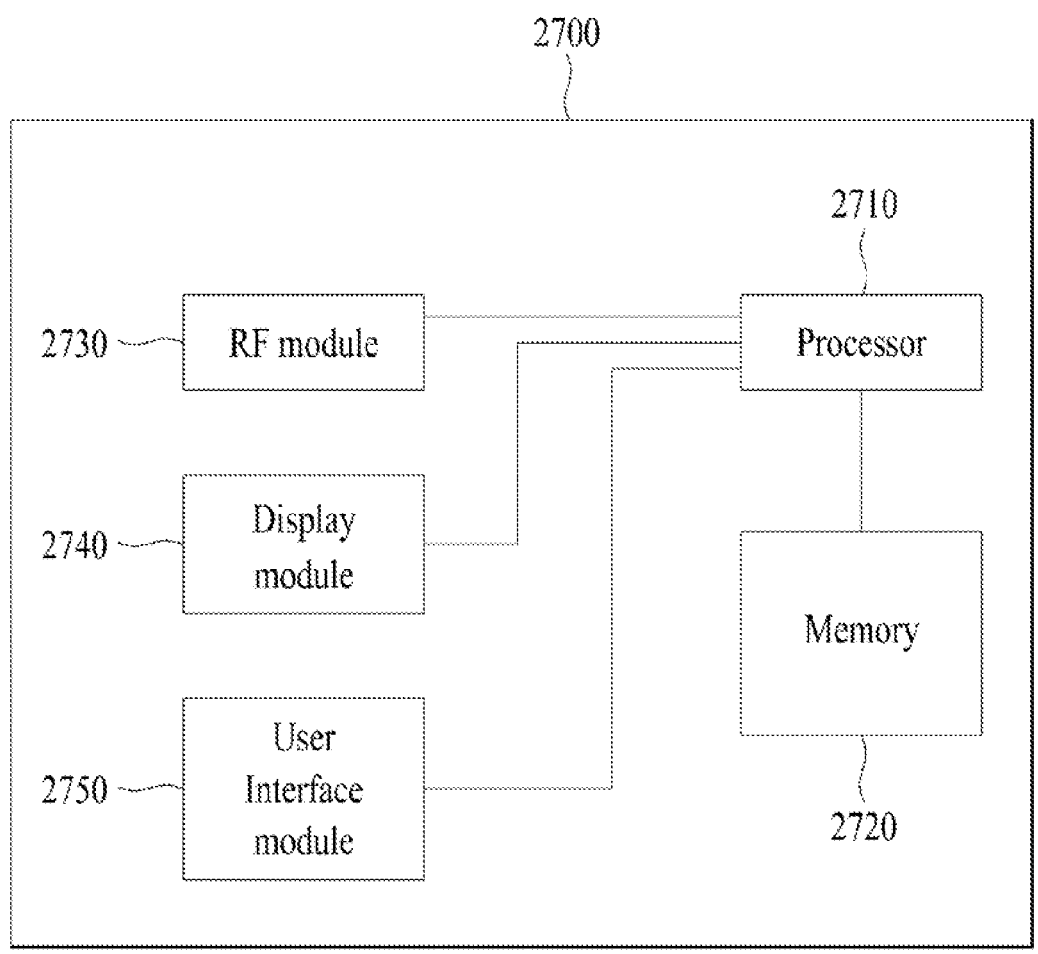
FIG. 27 is a block diagram of an example for a communication device according to one embodiment of the present invention.

FIG. 27 is a block diagram of an example for a communication device according to one embodiment of the present invention.

Referring to FIG. 27, a communication device 2700 may include a processor 2710, a memory 2720, an RF module 2730, a display module 2740, and a user interface module 2750.

Since the communication device 2700 is depicted for clarity of description, prescribed module(s) may be omitted in part. The communication device 2700 may further include necessary module(s). And, a prescribed module of the communication device 2700 may be divided into subdivided modules. A processor 2710 is configured to perform an operation according to the embodiments of the present invention illustrated with reference to drawings. In particular, the detailed operation of the processor 2710 may refer to the former contents described with reference to FIG. 1 to FIG. 26.

The memory 2720 is connected with the processor 2710 and stores an operating system, applications, program codes, data, and the like. The RF module 2730 is connected with the processor 2710 and then performs a function of converting a baseband signal to a radio signal or a function of converting a radio signal to a baseband signal. To this end, the RF module 2730 performs an analog conversion, amplification, a filtering, and a frequency up conversion, or performs processes inverse to the former processes. The display module 2740 is connected with the processor 2710 and displays various kinds of informations. And, the display module 2740 can be implemented using such a well-known component as an LCD (liquid crystal display), an LED (light emitting diode), an OLED (organic light emitting diode) display and the like, by which the present invention may be non-limited. The user interface module 2750 is connected with the processor 2710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting a channel state information, which is transmitted by a user equipment in a wireless communication system, and apparatus therefor are described with reference to examples applied to 3GPP LTE system, it may be applicable to various kinds of wireless communication systems as well as to the 3GPP LTE system.

What is claimed is:

1. A method of transmitting a rank indicator (RI) to a serving base station at a user equipment in a wireless communication system, the method comprising:

mapping at least one periodic RI and at least one aperiodic RI to a physical uplink shared channel (PUSCH) of a subframe, if a report on the at least one periodic RI and a report on the at least one aperiodic RI occur in a same subframe; and transmitting the at least one periodic RI and the at least one aperiodic RI to the serving base station, wherein the at least one periodic RI and the at least one aperiodic RI are separately time first mapped to resource elements corresponding to a pre-defined symbol of the subframe, wherein the at least one aperiodic RI corresponds to at least one component carrier configured in each of the serving base station and a neighboring base station for a coordinated multi point (CoMP) transmission of the serving base station and the neighboring base station, wherein the at least one periodic RI corresponds to at least one component carrier configured in the serving base station for a non-CoMP transmission, and wherein mapping the at least one periodic RI and the at least one aperiodic RI comprises performing the time first mapping of the at least one periodic RI to the resource elements corresponding to the pre-defined symbol in a descending order of a subcarrier index, after performing the time first mapping of the at least one aperiodic RI to the resource elements corresponding to the pre-defined symbol of the subframe in the descending order of the subcarrier index.

2. The method of claim 1, wherein mapping the at least one periodic RI and the at least one aperiodic RI comprises:
   performing the time first mapping of the at least one aperiodic RI to the resource elements corresponding to the pre-defined symbol of the subframe in a descending order of a subcarrier index;
   performing the time first mapping of CQI (channel quality indicator)/PMI (precoding matrix index) information in an ascending order of the subcarrier index; and
   performing the time first mapping of the at least one periodic RI followed by the CQI/PMI information in the ascending order of the subcarrier index.

3. The method of claim 1, wherein mapping the at least one periodic RI and the at least one aperiodic RI comprises mapping each of the at least one aperiodic RI and the at least one periodic RI in an eNode B index order.

4. The method of claim 1, wherein mapping the at least one periodic RI and the at least one aperiodic RI comprises mapping each of the at least one aperiodic RI and the at least one periodic RI in a component carrier index order.

5. A user equipment device in a wireless communication system, comprising:
   a processor configured to map at least one periodic rank indicator (RI) and at least one aperiodic RI to a physical uplink shared channel (PUSCH) of a subframe if a report on the at least one periodic RI and a report on the at least one aperiodic RI occur in a same subframe; and
   a transmission module configured to transmit the at least one periodic RI and the at least one aperiodic RI to a serving base station, wherein the at least one periodic RI and the at least one aperiodic RI are separately time first mapped to resource elements corresponding to a pre-defined symbol of the subframe, wherein the at least one aperiodic RI corresponds to at least one component carrier configured in each of the serving base station and a neighboring base station for a coordinated multi point (CoMP) transmission of the serving base station and the neighboring base station, and the at least one periodic RI corresponds to at least one component carrier configured in the serving base station for a non-CoMP transmission, and wherein the processor is configured to perform the time first mapping of the at least one aperiodic RI to the resource elements corresponding to the pre-defined symbol of the subframe in a descending order of a subcarrier index, and then to perform the time first mapping of the at least one periodic RI to the resource elements corresponding to the pre-defined symbol in the descending order of the subcarrier index.

6. The user equipment device of claim 5, wherein the processor is configured to perform the time first mapping of the at least one aperiodic RI to the resource elements corresponding to the pre-defined symbol of the subframe in a descending order of a subcarrier index, perform the time first mapping of CQI (channel quality indicator)/PMI (precoding matrix index) information in an ascending order of the subcarrier index, and perform the time first mapping of the at least one periodic RI followed by the CQI/PMI information in the ascending order of the subcarrier index.

7. The user equipment device of claim 5, wherein the processor is configured to map each of the at least one aperiodic RI and the at least one periodic RI in an eNode B index order.

8. The user equipment device of claim 5, wherein the processor is configured to map each of the at least one aperiodic RI and the at least one periodic RI in a component carrier index order.

* * * * *